United States Patent [19]

Kobayashi et al.

[11] Patent Number: 5,361,338
[45] Date of Patent: Nov. 1, 1994

[54] PIPELINED SYSTEM FOR DECOMPOSING INSTRUCTION INTO TWO DECODING PARTS AND EITHER CONCURRENTLY GENERATING TWO OPERANDS ADDRESSES OF MERGING DECOMPOSING DECODING CODES BASED UPON THE SECOND OPERAND

[75] Inventors: Souichi Kobayashi; Masahito Matsuo, both of Itami, Japan

[73] Assignee: Mitsubishi Denki Kabushiki Kaisha, Tokyo, Japan

[21] Appl. No.: 973,926

[22] Filed: Nov. 9, 1992

Related U.S. Application Data

[63] Continuation of Ser. No. 420,084, Oct. 11, 1989, abandoned.

[30] Foreign Application Priority Data

Oct. 14, 1988 [JP] Japan .................. 63-259723

[51] Int. Cl.⁵ ............................ G06F 9/30; G06F 9/34
[52] U.S. Cl. .................. 395/375; 364/231.8; 364/247.5; 364/247.6; 364/259.9
[58] Field of Search ............................. 395/375

[56] References Cited

U.S. PATENT DOCUMENTS

| | | |
|---|---|---|
| 3,614,741 | 10/1971 | McFarland et al. . |
| 3,958,221 | 5/1976 | Serra et al. . |
| 4,241,397 | 12/1980 | Stecker et al. ............. 395/375 |
| 4,320,454 | 3/1982 | Suzuki et al. . |
| 4,398,245 | 8/1983 | Fujita . |
| 4,402,042 | 8/1983 | Guttag . |
| 4,454,578 | 6/1984 | Matsumoto et al. . |
| 4,598,365 | 7/1986 | Boothroyd et al. ............ 395/375 |
| 4,631,672 | 12/1986 | Sakamoto ................. 395/375 |
| 4,644,466 | 2/1987 | Saito ..................... 395/775 |
| 4,797,816 | 1/1989 | Uchiyama et al . |
| 4,827,402 | 5/1989 | Wada . |
| 4,897,787 | 1/1990 | Kawasaki et al. ............ 395/375 |
| 4,901,236 | 2/1990 | Utsumi ................... 395/400 |
| 4,933,841 | 6/1990 | Mori et sl. ............... 395/375 |
| 4,945,511 | 7/1990 | Itomitsu et al. . |
| 4,967,339 | 10/1990 | Fukumara et al. . |
| 5,041,968 | 8/1991 | Yamaguchi ............... 395/725 |
| 5,091,853 | 2/1992 | Watanabe et al. ........... 395/375 |
| 5,136,696 | 8/1992 | Beckwith et al. ............ 395/375 |

FOREIGN PATENT DOCUMENTS 63-89932 9/1988 Japan .

OTHER PUBLICATIONS

K. F. Lee et al; "Branch Prediction Strategies & Branch Target Buffer Design," *Computer,* Lee et al, Jan. 1984.

*Primary Examiner*—Parshotam S. Lall
*Assistant Examiner*—Krisna Lim
*Attorney, Agent, or Firm*—Townsend and Townsend Khourie and Crew

[57] ABSTRACT

A pipelined data processor decomposes an instruction into a plurality of processing units (step codes), each corresponding to an operand of the instruction. In the register direct addressing mode, where the source operand of the instruction is an immediate value and the destination operand of the instruction is a register, the data processor combines the two step codes associated with the two operands into one. Thus, the number of cycles required for processing the instruction is reduced.

7 Claims, 27 Drawing Sheets

(SERIAL BIT NUMBER)

0        7 8        15 16       23 24       31

(BIT NUMBER IN EACH BYTE)

N         N+1         N+2         N+3

(ADDRESS)

←LOW ADDRESS            HIGH ADDRESS→
←MSB SIDE                    LSB SIDE→

→→DIRECTION OF READ INSTRUCTION→→
INSTRUCTION FORMAT

BYTE: 0        1        2 -------- N+2-1

REDUCED-TYPE INSTRUCTION FORMAT BETWEEN MEMORY AND REGISTER

BYTE: 0        1

REDUCED-TYPE INSTRUCTION FORMAT BETWEEN REGISTER AND REGISTER

BYTE: 0        1        2 -------- N+2-1

REDUCED-TYPE INSTRUCTION FORMAT BETWEEN LITERAL AND MEMORY

REDUCED-TYPE INSTRUCTION FORMAT BETWEEN IMMEDIATE VALUE AND MEMORY

GENERAL-TYPE INSTRUCTION FORMAT OF ONE-OPERAND INSTRUCTION

G-FORMAT INSTRUCTION

E-FORMAT INSTRUCTION

INSTRUCTION FORMAT WHERE FIRST OPERAND IS ADDRESS CALCULATION ONLY

SHORT FORMAT BRANCH INSTRUCTION

INSTRUCTION FORMAT FOR REGISTER DIRECT MODE

INSTRUCTION FORMAT FOR REGISTER INDIRECT MODE

INSTRUCTION FORMAT FOR REGISTER RELATIVE INDIRECT MODE

INSTRUCTION FORMAT FOR IMMEDIATE VALUE MODE

INSTRUCTION FORMAT FOR ABSOLUTE MODE

INSTRUCTION FORMAT FOR PC RELATIVE INDIRECT MODE

INSTRUCTION FORMAT FOR STACK POP MODE

INSTRUCTION FORMAT FOR STACK PUSH MODE

INSTRUCTION FORMAT FOR REGISTER BASE CHAIN ADDRESSING MODE

INSTRUCTION FORMAT FOR PC BASE CHAINED ADDRESSING MODE

INSTRUCTION FORMAT FOR ABSOLUTE BASE CHAINED ADDRESSING MODE

INSTRUCTION FORMAT FOR CHAINED ADDRESSING MODE

VARIATION OF INSTRUCTION FORMAT FOR CONTINUATION AND COMPLETION OF CHAINED ADDRESSING MODE

INSTRUCTION FORMAT FOR VARIATION OF THE SIZE OF DISPLACEMENT

BASIC INSTRUCTION FORMAT OF DATA
PROCESSOR OF THIS INVENTION

Fig. 34

| INSTRUCTION | SNTUEMPBER | RCODE/RCODE EFFECTIVE SIGNAL | REGISTER NUMBER CONTROL | | SIZE CONTROL | |
|---|---|---|---|---|---|---|
| | | | Rs | RD | Ws | WD |
| POP | 1 | EN ONLY WHEN DESTINATION IS MEMORY | — | RD | Ws | WD |
| | 2 | ALWAYS EN | RR | Don't Change | — | WR |
| ADD:1 | 1 | EN ONLY WHEN DESTINATION IS MEMORY | — | RR | RR | Don't Change |
| | 2 | ALWAYS EN | RR | Don't Change | RR | Don't Change |

— : NO DESIGNATION
EN : ENABLE

PIPELINED SYSTEM FOR DECOMPOSING INSTRUCTION INTO TWO DECODING PARTS AND EITHER CONCURRENTLY GENERATING TWO OPERANDS ADDRESSES OF MERGING DECOMPOSING DECODING CODES BASED UPON THE SECOND OPERAND

This is a continuation of application Ser. No. 07/420,084, filed Oct. 11, 1989, now abandoned.

BACKGROUND OF THE INVENTION

1. Field of the Invention

The present invention relates to a data processor which operates by a pipeline processing system, and specifically relates to a data processor which processes an instruction wherein a source operand is an immediate value, and a destination operand is specified by a register direct addressing mode.

2. Description of Related Art

FIG. 1 is a block diagram showing a configuration of a pipeline processing function of a conventional data processor.

The conventional data processor is constituted with an instruction fetching stage 391, an instruction decoding stage 392, an operand address calculation stage 393, an operand fetch stage 394 and an instruction execution stage 395. Then, an instruction is decomposed into a plurality of unit codes (step codes) for pipeline processing in the decoding stage to be pipeline-processed. Detail of such a data processor has been disclosed in Japanese Patent Application Laid-Open No. 63-89932 (1988).

In the conventional data processor as described above, elements constituting a pipeline are divided into a portion which executes pre-processing of the instruction fetch stage 391, the instruction decoding stage 392, the operand address calculation stage 393, the operand fetch stage 394 and the like and a portion which executes the instruction such as the instruction execution stage 395. The portion of preprocessing executes only pre-processing relating to an operand specified in the instruction. Then, the instruction is executed by the execution stage 395 using the operand prepared by the pre-processing.

However, in such a data processor, as to instructions such as an transfer instruction between a memory and a memory or between a memory and a register which transfer data from a source operand to a destination operand, a unit processing code relating to the source operand and a unit processing code relating to the destination operand are produced on the pipeline. However, in an instruction wherein the source operand is an immediate value and the destination operand is specified by the register direct addressing mode, the unit processing code of destination is not required. Accordingly, in processing an instruction of the register direct addressing mode, wasteful processing of the unit processing code is executed, and the efficiency of the whole of the processor is reduced.

The present invention has been achieved to solve such a problem, and purposes to provide a data processor which can efficiently process an instruction wherein the source operand is an immediate value and the destination operand is specified in the register direct addressing mode on the pipeline.

SUMMARY OF THE INVENTION

A data processor in accordance with the present invention decomposes an instruction into a plurality of processing units (step codes), each corresponding to an operand of the instruction. The data processor processes a processing unit of a destination operand and a processing unit of a source operand, produces one processing unit therefrom and terminates processing the processing unit of the destination operand before the instruction is executed in the case where the source operand is an immediate value and the destination operand is a register.

In the data processor of the present invention, processing relating to the destination operand is not executed where the destination is a register.

The above and further objects and features of the invention will more fully be apparent from the following detailed description with accompanying drawings.

BRIEF DESCRIPTION OF THE DRAWINGS

FIG. 34 is a table showing contents of a R code/F code enable signal, a register number control signal and a size control signal which are outputs of a second decoder in FIG. 31, FIGS. 35(a) and (b) are flow charts showing processing sequences of a POP instruction in a pipeline processing mechanism, FIGS. 36(a), (b), (c) and (d) are schematic diagrams showing processing flows of step codes in stages in and after the D stage of the POP instruction, FIGS. 37(a) and (b) are schematic diagrams showing instruction formats of the POP instruction.

DESCRIPTION OF THE PREFERRED EMBODIMENTS

Hereinafter, detailed description is made on the present invention based on drawings showing one embodiment thereof.

(1) "Instruction Format of Data Processor of the Present Invention"

An instruction of a data processor of the present invention is formed on a 16-bit unit basis, being variable in length, and no instruction of odd bytes is used herein.

The data processor of the present invention has an instruction format system specifically devised for the purpose of writing a highly frequent instruction in a short format. For example, as to a two-operand instruction, two formats are provided; a general-type format which has basically a configuration of "four bytes+extension part(s)" and allows the utilization of all addressing modes and a reduced-type format allowing only the use of a highly frequent instruction and an addressing mode.

The meanings of symbols appearing in the instruction format of the data processor of the present invention are as follows:

—: Portion wherein operation code is put.

: Portion wherein literal or;immediate value is put.

Ea: Portion for generating an operand in a general-type 8-bit addressing mode.

Sh: Portion for designating an operand in a reduced-type 6-bit addressing mode.

Rn: Portion for designating an operand in a register by the register number.

Figure 1:
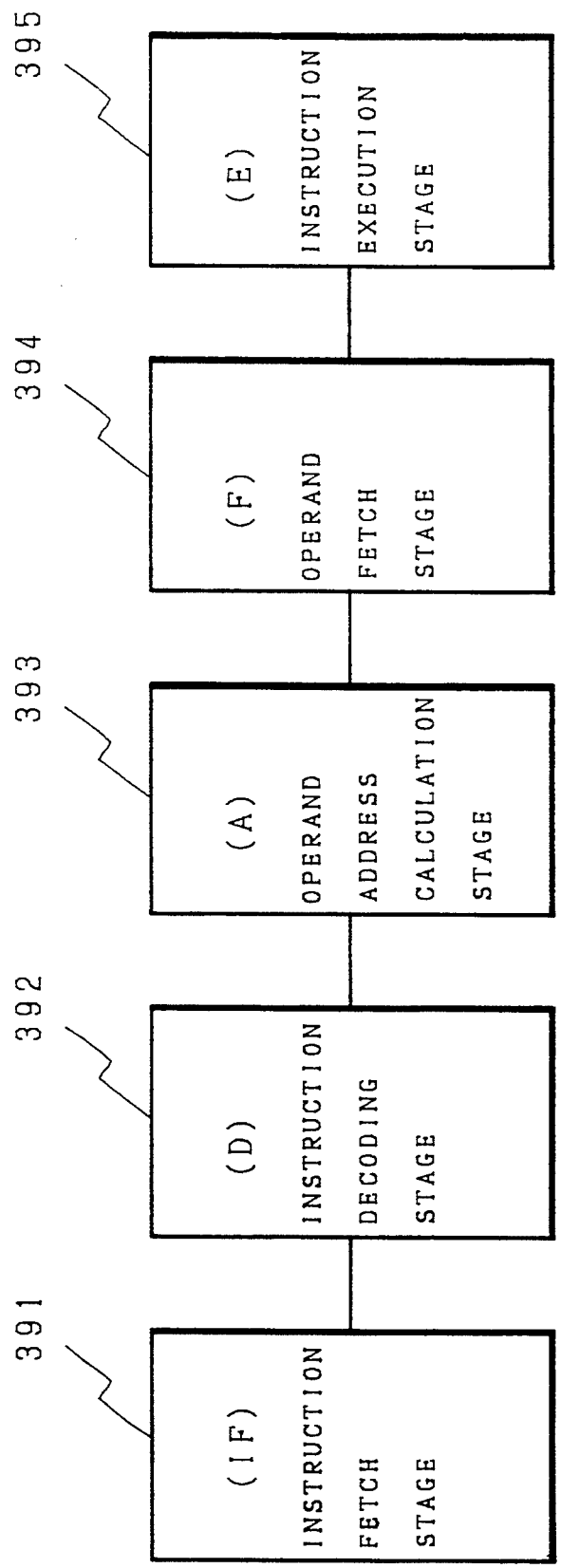
FIG. 1 is a block diagram showing a configuration of a pipeline processing mechanism in a conventional data processor.
Figure 2:
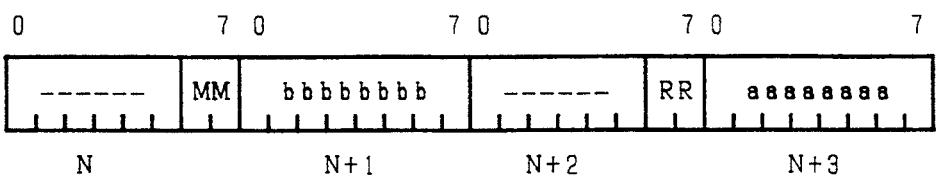
FIG. 2 is a schematic diagram showing a typical form of an instruction format of a data processor in accordance with the present invention.

In the format, as shown in FIG. 2, the right side is the LSB side and is high address. The instruction format can be discriminated only after an address N and an address N+1 are checked, and as described above, this is because of a premise that the instruction is fetched and decoded on a 16-bit (2-byte) unit basis without fail.

In the data processor of the present invention, in the case with any format, the extension part of Ea or Sh of each operand is sure to be positioned immediately after a half word comprising the basic part of that Ea or Sh. This takes precedence over the immediate value data specified implicitly by the instruction or the extension part of the instruction. Accordingly, as to an instruction of four or more bytes, there are cases where the operation code of the instruction is divided by the extension part of Ea.

Also, as described later, where another extension part is further attached to the extension part of Ea by a chained addressing mode, this part takes precedence over the next instruction. For example, consideration is made on the case of 6-byte instruction which comprises Ea1 in a first half word, Ea2 in a second half word, and ends with a third half word. Since the chained addressing mode is used for Ea1, another extension part of the chained addressing mode is assumed to be attached in addition to the ordinary extension part, and then the actual instruction bit pattern is composed in the sequence of the first word of instruction (including the basic part of Ea1), the expansion part of Ea1, the chained addressing mode extension part, the second half word of instruction (including the basic part of Ea2), the expansion part of Ea1 and the third half word of instruction.

(1.1) "Reduced-Type Two-Operand Instruction"

FIG. 3 through FIG. 6 are schematic diagrams showing reduced-type formats of the two-operand instruction.

Figure 3:
FIG. 3 is a schematic diagram showing a reduced-type format of an operational instruction between memory and register according to the present invention.

FIG. 3 is a schematic diagram showing a format of an operational instruction between memory and register. This format includes a L-format wherein the source operand side is a memory and a S-format wherein the destination operand side is a memory.

In the L-format, Sh represents the designating field of the source operand, Rn represents the designating field of the register of the destination operand and RR represents designating of the operand size of Sh, respectively. The size of the destination operand located in the register is fixed to 32 bits. Where the size of the resister side differs from that of the memory side and the size of the source side is smaller, sign extension is performed.

In the S-format, Sh represents the designating field of the destination operand, Rn represents the register designating field of the source operand and RR represents designating of the operand size of Sh, respectively. The size of the source operand located in the register is fixed to 32 bits. Where the size of the register side differs from that of the memory side and the size of the source side is larger, truncating of the overflow portion and overflow check are performed.

Figure 4:
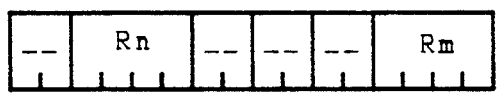
FIG. 4 is a schematic diagram showing a reduced-type format of an operational instruction between register and register according to the present invention.

FIG. 4 is a schematic diagram showing a format of an operational instruction between register and register (R-format). Rn represents the designating field of the destination register, and Rm represents the designating field of the source register. The operand size is 32 bits only.

Figure 5:
FIG. 5 is a schematic diagram showing a reduced-type format of an operational instruction between literal and memory according to the present invention.

FIG. 5 is a schematic diagram showing a format of an operational instruction between literal and memory (Q-format). MM shows the designating field of the destination operand size, ### shows the designating field of the source operand by literal, and Sh shows the designating field of the destination operand.

Figure 6:
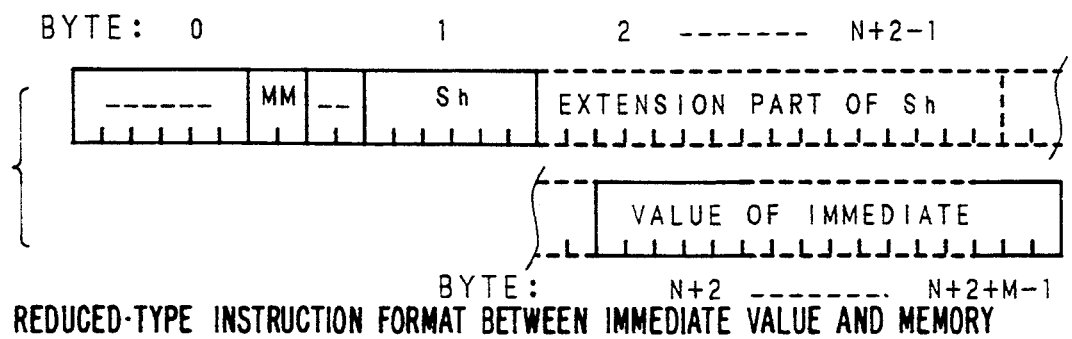
FIG. 6 is a schematic diagram showing a reduced-type format of an operational instruction between immediate value and memory according to the present invention.

FIG. 6 is a schematic diagram showing a format of an operational instruction between immediate value and memory (I-format). MM represents the designating field of the operand size (common in source and destination), and Sh represents the designating field of the destination operand. The sizes of the immediate value of the I-format are 8, 16 and 32 bits in common with the sizes of the operand of the destination side, and zero extension and sign extension are not performed.

(1.2) "General-Type One-Operand Instruction"

Figure 7:
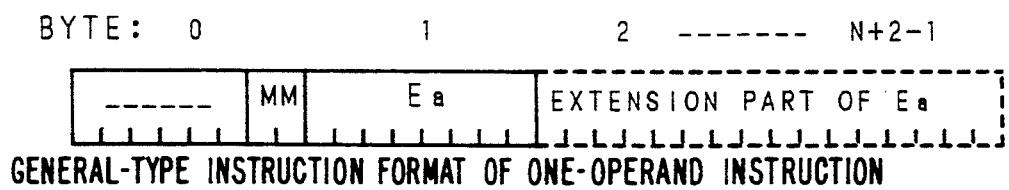
FIG. 7 is a schematic diagram showing a general-type format of a one-operand instruction according to the present invention.

FIG. 7 is a schematic diagram showing a general-type format of one-operand instruction (G1-format). MM represents the designating field of the operand size. Some of the G1-format instructions comprise an extension part besides the extension part of Ea. There are also instructions using no MM.

(1.3) "General-Type Two-Operand Instruction"

Figure 8:
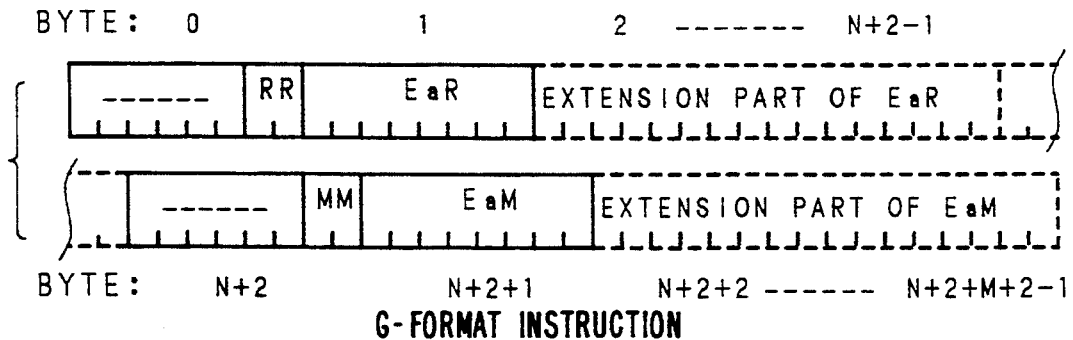
FIG. 8 is a schematic diagram showing a general-type format of a two-operand instruction wherein a first operand instruction necessitates memory read-out according to the present invention.
Figure 9:
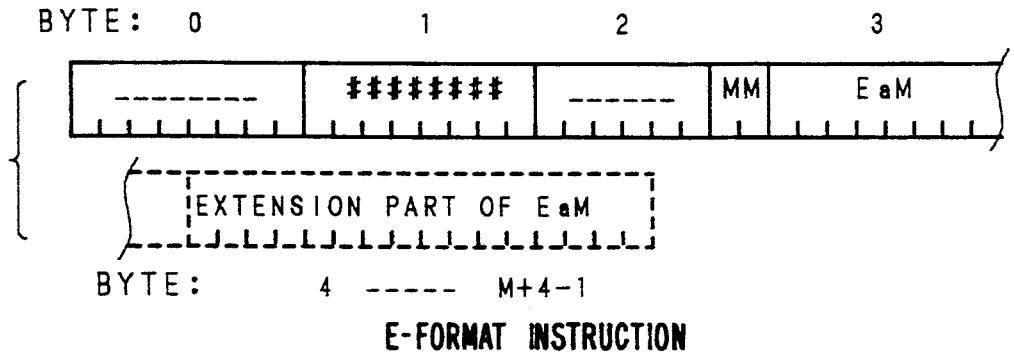
FIG. 9 is a schematic diagram showing a general-type format of a two-operand instruction wherein a first operand is an eight-bit immediate value according to the present invention.
Figure 10:
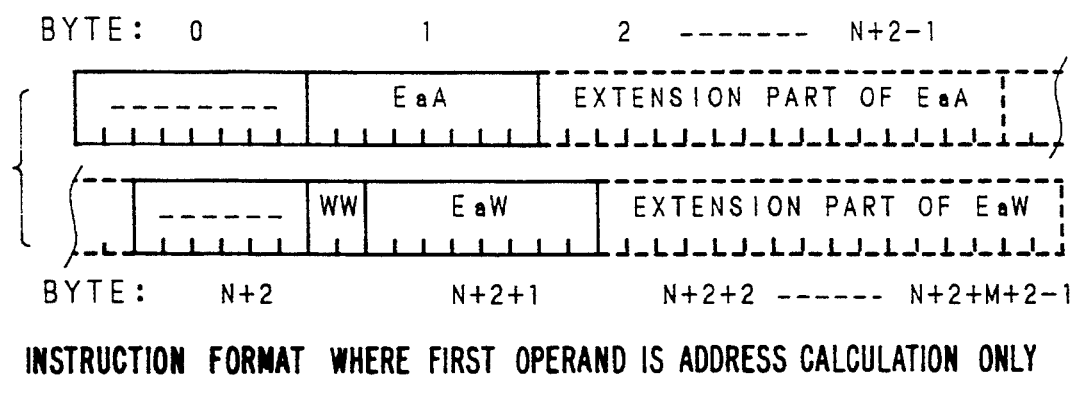
FIG. 10 is a schematic diagram showing a general-type format of a two-operand instruction wherein a first operand is only address calculation according to the present invention.

FIG. 8 through FIG. 10 are schematic diagrams showing general-type formats of two-operand instruction. This format comprises an instruction having a maximum of two operands of the general-type addressing mode which are designated by eight bits. There are cases where the total number itself of operands becomes three or more.

FIG. 8 is a schematic diagram showing a format of an instruction wherein a first operand necessitates memory read-out (G-format). EaM represents the designating field of the destination operand, MM represents the designating field of the destination operand size, EaR represents the designating field of the source operand, and RR represents the designating field of the source operand size. Some of the G-format instructions comprise an extension part besides the extension part of EaR.

FIG. 9 is a schematic diagram showing a format of an instruction wherein a first operand is an instruction of eight-bit immediate value (E-format). EaM represents the designating field of the destination operand, MM represents the designating field of the destination operand size, and ## . . . represents the source operand value.

The E-format and the I-format have similar functions, but their conceptions greatly differ from each other. Specifically, the E-format is coherently of a type derived from the general type of two-operand (G-format), the size of source operand is eight-bit fixed, and the size of destination operand is selected from among 8, 16 and 32 bits. This means that the E-format presupposes operation between different sizes, and the source operand of eight bits is zero-extended or code-extended in a manner of agreeing with the size of the destination operand. On the other hand, the I-format is of a type that the patterns of immediate value having high frequency particularly in the transfer instruction and the comparison instruction are shortened, and the sizes of the source operand and the destination operand are equal.

FIG. 10 is a schematic diagram showing a format of an instruction wherein a first operand is only address calculation. EaW represents the designating field of the destination operand, WW represents the designating field of the destination operand size, and EaA represents the designating field of the source operand. For the source operand, the calculation result itself of executed address is used.

Figure 11:
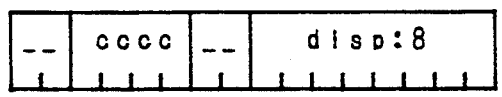
FIG. 11 is a schematic diagram showing an instruction format of short branch according to the present invention.

FIG. 11 is a schematic diagram showing a format of a short branch instruction. Symbol cccc represents the designating field of branch condition, disp:8 represents the designating field of displacement to a jump destination, and in the data processor of the present invention, when displacement is designated by eight bits, the displacement value is set by doubling the designated value in the bit pattern.

(1.4) "Addressing Mode"

The methods of designating the addressing mode of the data processor of the present invention include the reduced type designated by six bits including the register and the general type designating by eight bits.

Where an undefined addressing code has been designated, or where a combination of addressing modes obviously unsuitable has been designated, a reserve instruction exception is generated likewise the case where the undefined instruction has been executed, and exception processing is started.

Equivalents to the above include the case where the destination is the immediate value mode and the case where the immediate value mode is used in the designating field of the addressing mode to be accompanied by address calculation.

Meanings of symbols used in the format diagram is as follows:

Rn: Register designating mem [EA]: Memory content of address as shown by EA (Sh): Designating method by the reduced-type addressing mode of six bits (Ea) : Designating method by the general-type addressing mode of eight bits In the format diagram, the portion surrounded by a broken line shows the extension part.

(1.4.1) "Basic Addressing Modes"

The data processor of the present invention supports various addressing modes. Among them, the basic addressing modes supported by the data processor of the present invention include a register direct mode, a register indirect mode, a register relative indirect mode, an immediate value mode, an absolute mode, a PC (Program Counter) relative indirect mode, a stack pop mode and a stack push mode.

Figure 12:
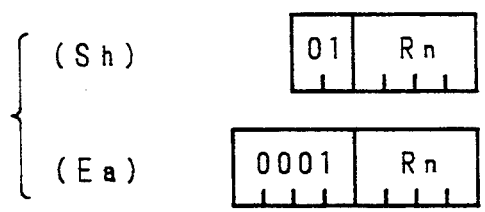
FIG. 12 is a schematic diagram showing a format wherein an addressing mode designating part is of a register direct mode according to the present invention.

The register direct mode takes the content of register intact as an operand. FIG. 12 is a schematic diagram of the format thereof. Symbol Rn shows the number of the general-purpose register.

Figure 13:
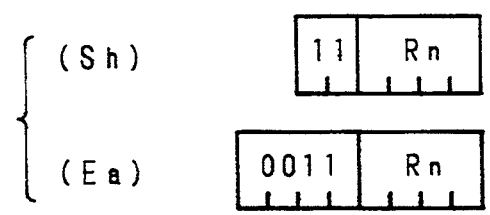
FIG. 13 is a schematic diagram showing a format wherein an addressing mode designating part is of a register indirect mode according to the present invention.

The register indirect mode takes the content of the memory whose address is the content of register as an operand, FIG. 13 is a schematic diagram of the format thereof, Symbol Rn shows the number of the general-purpose register.

Figure 14:
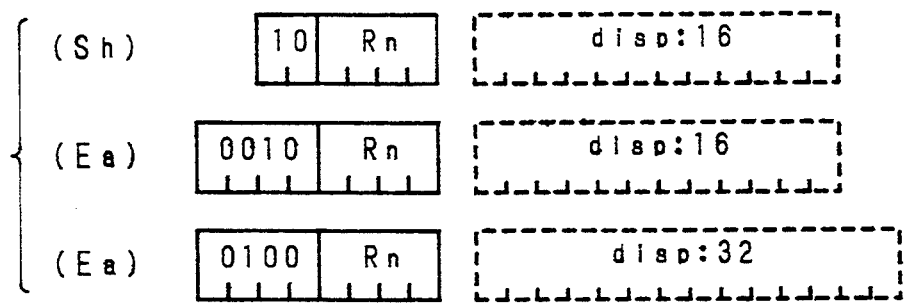
FIG. 14 is a schematic diagram showing a format wherein an addressing mode designating part is of a register relative indirect mode according to the present invention.

The register relative indirect mode includes two kinds of 16 bits and 32 bits of the displacement value. Each of them takes the content of the memory whose address is the value of the content of the register added to the displacement value of 16 bits or 32 bits as an operand, FIG. 14 is a schematic diagram of the format thereof, Symbol Rn shows the number of the general-purpose register, Symbols disp:16 and disp:32 show the displacement value of 16 bits and the displacement value of 32 bits, respectively. The displacement value is treated with a sign affixed.

Figure 15:
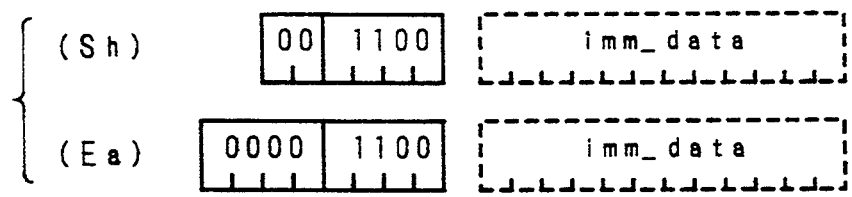
FIG. 15 is a schematic diagram showing a format wherein an addressing mode designating part is of an immediate value mode according to the present invention.

The immediate value mode takes the bit pattern designated in the instruction code as an operand while assuming it intact as a binary number. FIG. 15 is a schematic diagram of the format thereof. Symbol imm_data shows the immediate value. The size of imm_data is designated in the instruction as the operand size.

Figure 16:
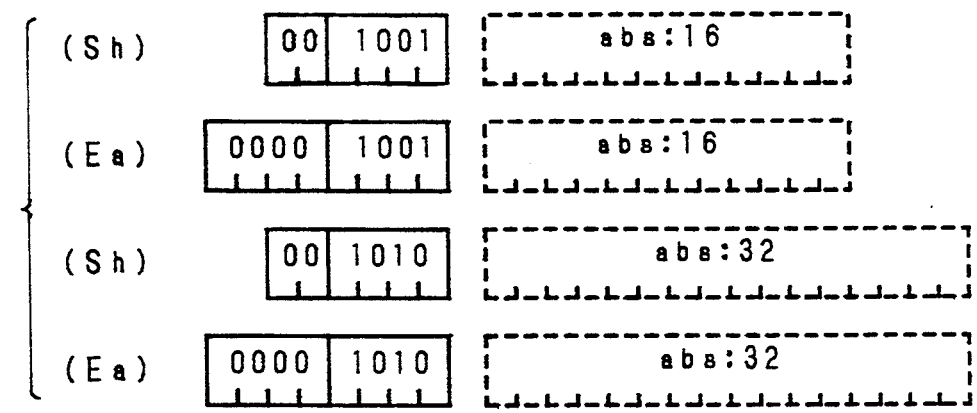
FIG. 16 is a schematic diagram showing a format wherein an addressing mode designating part is of an absolute mode according to the present invention.

The absolute mode includes two kinds of 16 bits and 32 bits for showing the address value. Each kind takes the content of the memory whose address is the bit pattern of 16 bits or 32 bits designated in the instruction code as an operand. FIG. 16 is a schematic diagram showing the format thereof. Symbols abs:16 and abs:32 show the address values of 16 bits and 32 bits, respectively. When the address is shown by abs:16, the designated address value is code-extended to 32 bits.

Figure 17:
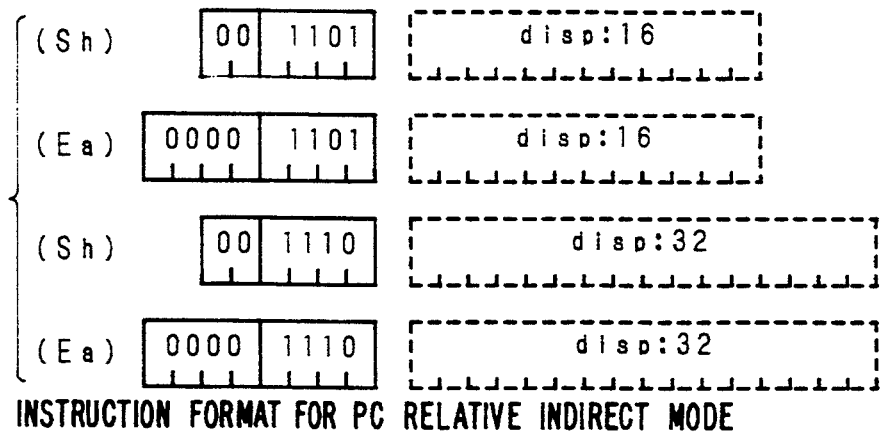
FIG. 17 is a schematic diagram showing a format wherein an addressing mode designating part is of a PC relative indirect mode according to the present invention.

The PC relative indirect mode includes two kinds of 16 bits and 32 bits of the displacement value. Each takes the content of the memory whose address is the value of the content of a program counter whereto the displacement value of 16 bits or 32 bits is added as an operand. FIG. 17 is a schematic diagram showing the format thereof. Symbols disp:16 and disp:32 show the displacement value of 16 bits and the displacement value of 32 bits, respectively. The displacement value is treated with a sign affixed. In the PC relative indirect mode, the value of the program counter to be referred is the head address of the instruction comprising the operand. Where the value of the program counter is referred in the chained addressing mode, the head address of the instruction is also used as a reference value of PC relativity.

Figure 18:
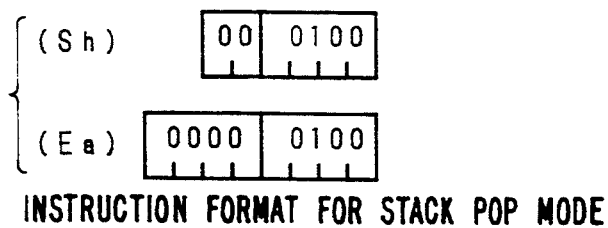
FIG. 18 is a schematic diagram showing a format wherein an addressing mode designating part is of a stack POP mode according to the present invention.

The stack pop mode takes the content of the memory whose address is the content of a stack pointer (SP) as an operand. After operand access, the stack pointer SP is incremented by the operand size. For example, where 32-bit data is handled, the SP is renewed (incremented) by +4 after the operand access. Designating of the stack pop mode for operands of sizes of B and H can also be performed, and the stack printer SP is renewed (incremented) by +1 and +2, respectively. FIG. 18 is a schematic diagram of the format thereof. As to the one wherein the stack pop mode is invalid for the operand, a reserve instruction exception is generated. Specifically, the stack pop mode designating for a write operand and a read-modify-write operand becomes the reserve instruction exception.

Figure 19:
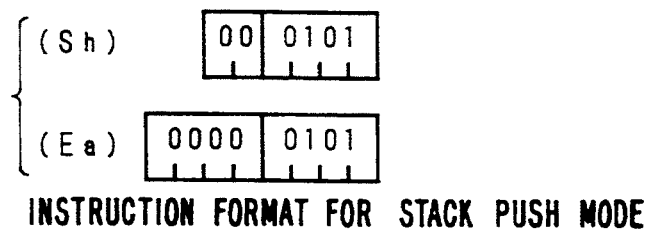
FIG. 19 is a schematic diagram showing a format wherein an addressing mode designating part is of a stack PUSH mode according to the present invention.

The stack push mode takes the content of the memory whose address is the content of the stack pointer SP decremented by the operand size as an operand. In the stack push mode, the stack pointer SP is decremented before operand access. For example, when handling 32-bit data, the stack pointer SP is renewed (decremented) by −4 before operand access. It is also possible to designate the stack push mode for operands of sizes of B and H, and the stack pointer SP is renewed (decremented) by −1 add −2, respectively. FIG. 19 is a schematic diagram showing the format thereof. As to the one wherein the stack push mode is invalid for the operand, a reserve instruction exception is generated. Specifically, the stack push mode designated for a read operand and a read-modify-write operand becomes the reserve instruction exception.

(1.4.2) "Chained Addressing Mode"

Addressing, whatever complicated, can basically be decomposed into combinations of addition and indirect reference. Accordingly, operations of addition and indirect reference are given in advance as primitives of addressing, and if they can be combined arbitrarily, any complicated addressing mode can be realized. The chained addressing mode of the data processor of the present invention is an addressing mode based on such a conception. A complicated addressing mode is particularly useful for data reference between modules or the processing system of AI (Artificial Intelligence) language.

When designating the chained addressing mode, in the basic addressing mode designated field, one from among three kinds of designating methods of a register base chained addressing mode, a PC base chained addressing mode and an absolute chained addressing mode is designated.

Figure 20:
FIG. 20 is a schematic diagram showing a format of a register base chained addressing mode according to the present invention.

The register base chained addressing mode is an addressing mode taking the value of register as the base value of the chained addressing to be extended. FIG. 20 is a schematic diagram showing the format thereof. Symbol Rn shows the number of the general-purpose register.

Figure 21:
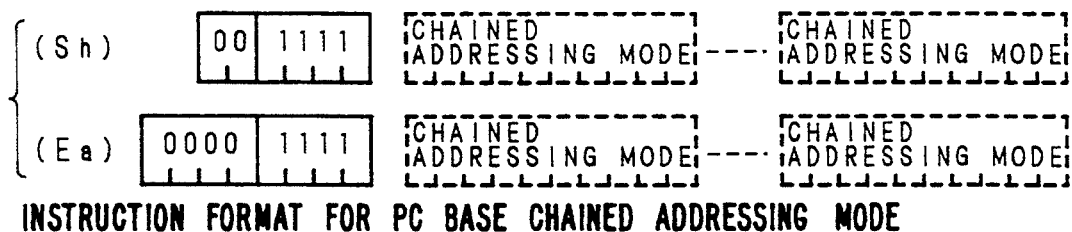
FIG. 21 is a schematic diagram showing a format of a PC base chained addressing mode according to the present invention.

The PC base chained mode is an addressing mode taking the value of the program counter (PC) as the base value of the chained addressing to be extended. FIG. 21 is a schematic diagram showing the format thereof.

Figure 22:
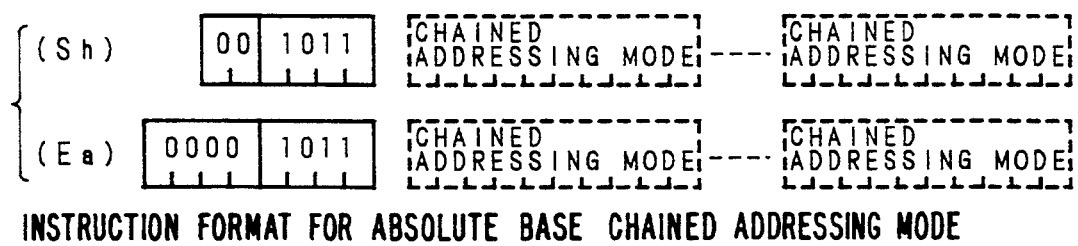
FIG. 22 is a schematic diagram showing a format of an absolute base chained addressing mode according to the present invention.

The absolute base chained addressing mode is an addressing mode taking zero as the base value of the chained addressing to be extended. FIG. 22 is a schematic diagram of the format thereof.

Figure 23:
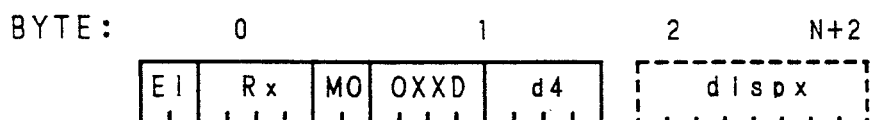
FIG. 23 is a schematic diagram showing designating fields for addition of displacement value, scaling and addition of index value, and indirect reference of memory in a format of one stage in a chained addressing mode according to the present invention.

The chained addressing mode designating field to be extended takes 16 bits as a unit, and this is repeated arbitrary times. By the chained addressing mode of one stage, addition of displacement, scaling ($\times 1, \times 2, \times 4, \times 8$) and addition of an index register, and indirect reference of a memory are performed. FIG. 23 is a schematic diagram showing the format of the chained addressing mode. Each field has meanings as shown below.

E=0: Continuation of the chained addressing mode is continued.

E=1: Address calculation ends. tmp==>address of operand

I=0: No memory indirect reference is performed.
tmp+disp+Rx * Scale==>tmp

I=1: Memory indirect reference is performed. mem [tmp+disp+Rx * Scale]==>tmp

M=0: <Rx> is used as an index.

M=1: Special index

<Rx>=0 Index value is not added. (Rx=0)

<Rx>=1 Program counter is used as an index value. (Rx=PC)

<Rx>=2— Reserved.

D=0: The value of field d4 of four bits in the chained addressing mode is quadrupled to be taken as a displacement value, and this value is added. The d4 is treated with a sign affixed, and is used by surely quadrupling it irrespective of the size of the operand.

D=1: The dispx (16/32 bits) designated in the extension part of the chained addressing mode is taken as a displacement value, the size of the extension part whereto this value is added is designated in the d4 field.

d4=0001 dispx: 16 bits d4=0010 dispx: 32 bits

XX: index scale (scale=1/2/4/8)

Where scaling of $\times 2$, $\times 4$, $\times 8$ has been performed for the program counter, an indefinite value is entered as an intermediate value (tmp) after completion of processing of that stage. The effective address obtained by this chained addressing mode becomes an unpredictable value, but no exception is generated. Designating of scaling for the program counter should not be performed.

Figure 24:
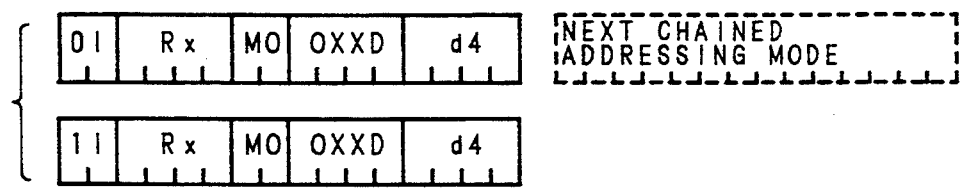
FIG. 24 is a schematic diagram showing a variation of whether or not the chained addressing mode is to be continued according to the present invention.
Figure 25:
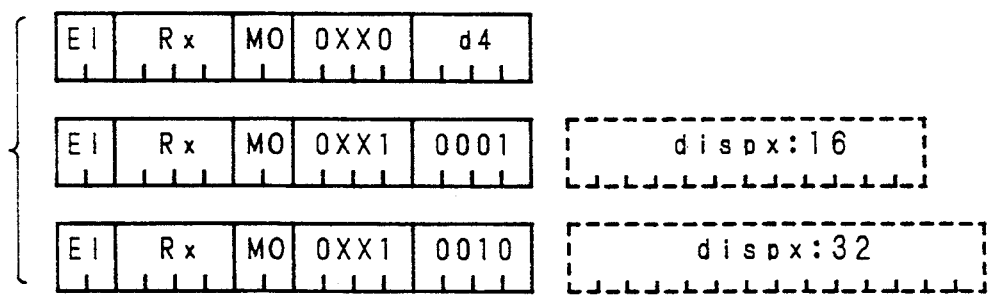
FIG. 25 is a schematic diagram showing a variation of size of displacement value according to the present invention.

FIG. 24 and FIG. 25 show variations on the instruction format formed by the chained addressing mode.

FIG. 24 shows variations of continuation and completion of the chained addressing mode.

FIG. 25 shows variations on the size of displacement.

If the chained addressing mode of an arbitrary number of stages can be utilized, the case-sorting on a number of stages basis in the compiler can be dispensed with, and therefore an advantage of alleviating the burden on the compiler is obtainable. This is because, even if frequency of chained reference is very low, the compiler has to be able to generate a correct code without fail. For this reason, an arbitrary number of stages can be applied in the format.

(1.5) "Exceptional Processing"

The data processor of the present invention has abundant exceptional processing functions for alleviating software load. In the data processor of this invention, there are three kinds of the exceptional processing, which are re-execution of instruction processing (named exception), completion of instruction processing (named trap) and interruption. In the data processor of the present invention, these three kinds of exceptional processings and system faults are generally called EIT.

(2) "Configuration of Function Block"

Figure 26:
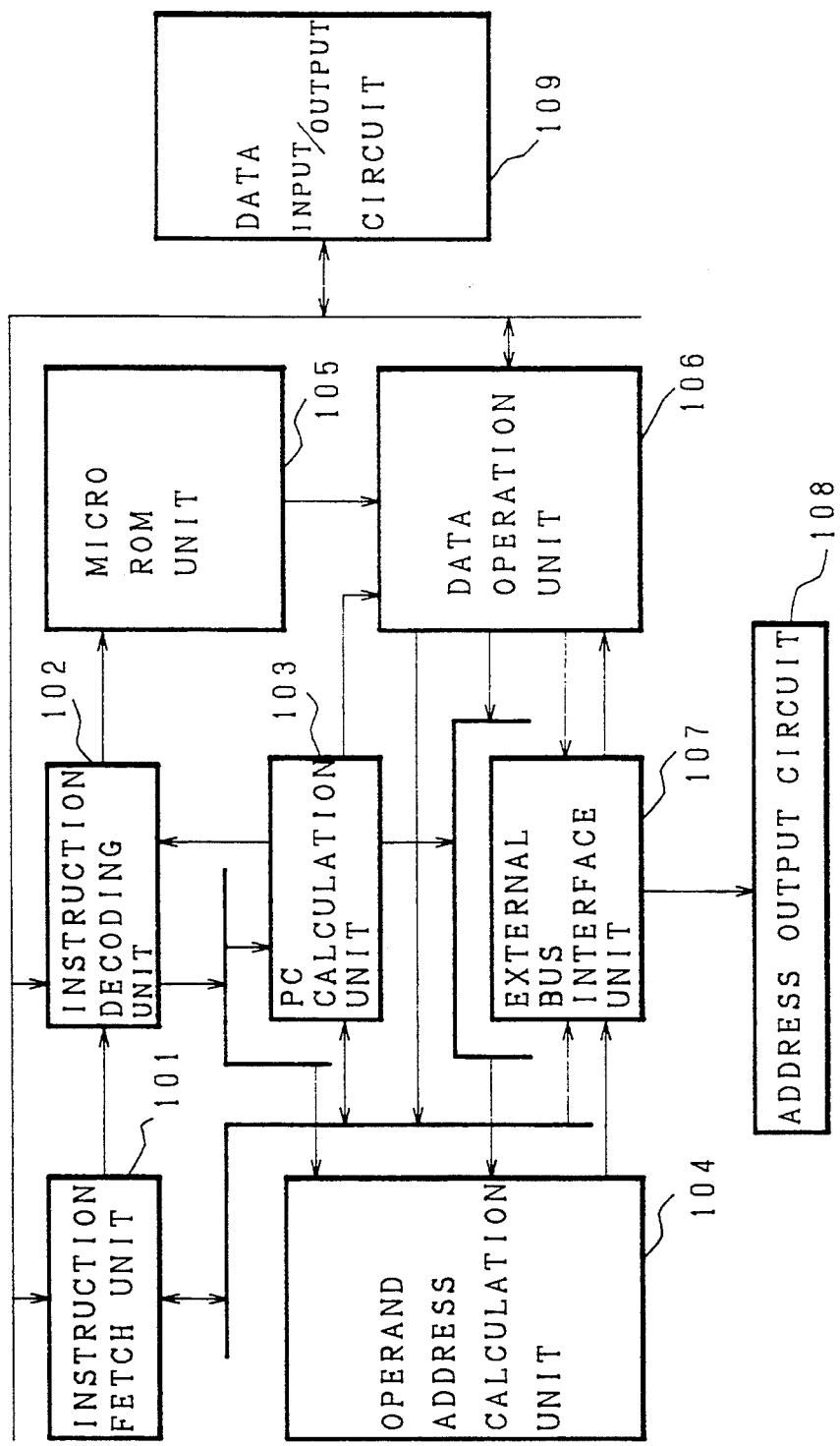
FIG. 26 is a block diagram showing a configuration of the data processor of the present invention.

FIG. 26 is a block diagram showing a configuration of the data processor of the present invention.

The interior of the data processor of the present invention is functionally divided roughly into an instruction fetch unit 101, an instruction decoding unit 102, a PC calculation unit 101, an operand address calculation unit 104, a micro ROM unit 105, a data operation unit 106 and an external bus interface unit 107.

In FIG. 26, in addition to the above-described units, an address output circuit 108 for outputting address to the exterior of a CPU and a data input/output circuit 109 for inputting and outputting data from and to the exterior of the CPU are shown being separated from the other function block units.

(2.1) "Instruction Fetch Unit"

The instruction fetch unit 101 which comprises a branch buffer, an instruction queue and a controlling unit thereof, determines the address of an instruction to be fetched next and fetches the instruction from the branch buffer or a memory outside the CPU. It also performs instruction registering to the branch buffer.

The branch buffer is small-scaled, therefore operating as a selective cache.

Detailed description on the operation of the branch buffer is disclosed in the Japanese Patent Application Laid-Open No. 63-56731 (1988) to Masahito Matsuo, et al, and corresponding to U.S. Pat. No. 4,796,175.

The address of an instruction to be fetched next is calculated by a dedicated counter as the address of the instruction to be inputted to an instruction queue 301. In the case where a branch or jump is generated, an address of a new instruction is transferred from the PC calculation unit 103 or the data operation unit 106.

In the case where an instruction is fetched from a memory outside the CPU, the address of the instruction to be fetched is outputted from the address output circuit 108 to the outside of the CPU through the external bus interface unit 107, and an instruction code is fetched from the data input/output circuit 109. Then, among the instruction codes in buffering, the instruction code to be decoded next is outputted to the instruction decoding unit 102.

(2.2) "Instruction Decoding Unit"

In the instruction decoding unit 102, basically an instruction code is decoded on a 16-bit (half word) basis. This block comprises a FHW decoder for decoding an operation code included in the first half word, a NFHW decoder for decoding an operation code including in the second and the third half words, and an addressing mode decoder for decoding an addressing mode. These FHW decoder, NFHW decoder and addressing mode decoder are generally called a first decoder 303.

There are also a second decoder 305 which further decodes an output of the FHW decoder and the NFHW decoder and calculates an entry address of the micro ROM, a branch predicting mechanism for performing branch prediction of a conditional branch instruction, and an address calculation conflict checking mechanism for checking pipeline conflict in calculating an operand address.

The instruction decoding unit 102 decodes the instruction code being inputted from the instruction fetch unit 101 by 0–6 bytes per two clocks (one step). Among the results of decoding, information on operation in the data operation unit 106 is outputted to the micro ROM unit 105, information on operand address calculation is outputted to the operand address calculation unit 104, and information on PC calculation is outputted to the PC calculation unit 103, respectively.

(2.3) "Micro ROM Unit"

The micro ROM unit 105 comprises a micro ROM for storing microprograms which mainly control the data operation unit 106, a micro sequencer, and a micro instruction decoder. A micro instruction is read out from the micro ROM once per two clocks (one step). The micro sequencer accepts processings of exception, interruption and trap (these three are generally called EIT) in a hardware manner in addition to the sequential processings shown by the microprograms. The micro ROM unit 105 also controls a store buffer. To the micro ROM unit 105, there are inputted flag information generated by interruption independent of the instruction code or by the result of operation execution, and output of an instruction decoding unit such as output of a second decoder 305. Output of the micro decoder is mainly performed to the data operation unit 106, but some information such as information of stopping other preceding processing due to execution of a jump instruction is outputted also to other blocks.

(2.4) "Operand Address Calculation Unit"

The operand address calculation unit 104 is controlled in a hardwired manner by information on operand address calculation outputted from the address decoder of the instruction decoding unit 102 or the like. In this block, substantially all of processings on operand address calculation are performed. Checking is made for whether or not the address of memory access for memory indirect addressing and the operand address can be entered in an I/O area mapped in the memory.

The result of address calculation is sent to the external bus interface unit 107. The values of the general-purpose register and the program counter required for address calculation are inputted from the data operation unit.

In performing the memory indirect addressing, the memory address to be referred is outputted from the address output circuit 108 to the outside of the CPU through the external bus interface unit 107, and the indirect address value inputted from the data input/output unit 109 is fetched through the instruction decoding unit 102.

(2.5) "PC Calculation Unit"

The PC calculation unit 103 is controlled in a hardwired manner by information on PC calculation outputted from the instruction decoding unit 102, and calculates the PC value of an instruction. The data processor of the present invention has a variable-length instruction set, and the length of that instruction can be found only after the instruction is decoded. For this reason, the PC calculation unit 103 generates the PC value of the next instruction by adding the length of the instruction outputted from the instruction decoding unit 102 to the PC value of the instruction in decoding. In the case where the instruction decoding unit 102 decodes a branch instruction and directs a branch in the decoding stage, the PC value of a branch destination instruction is calculated by adding a branch displacement in place of the instruction length to the PC value of the branch instruction. In the data processor of the present invention, performing a branch in the instruction decoding stage in response to the branch instruction is called pre-branch.

On this pre-branch approach, detailed description is disclosed in the Japanese Patent Application Laid-Open NO. 63-59830 (1988) to Fujia Itomitsu, et al and the Japanese Patent Application Laid-Open No. 63-55639 (1988) to Fujia Itositsu.

The result of calculation in the PC calculation unit 103 is outputted as the PC value of each instruction together with the result of decoding of the instruction, and in addition, is outputted to the instruction fetch unit 101 as the address of the instruction to be decoded next at prebranch. Also, it is used for the address for branch prediction of the instruction to be decoded next in the instruction decoding unit 102.

On the branch predicting approach, detailed description is disclosed in the Japanese Patent Application Laid-Open No. 63-175934 (1988) to Masahito Matsuo, et al, and corresponding to U.S. Pat. No. 4,847,753.

(2.8) "Data Operation Unit"

The data operation unit 108 is controlled by microprograms, and executes the operation required for realizing the function of each instruction by means of registers and an arithmetic unit according to output information of the micro ROM unit 105. In the case where the operand to be operated is an address or an immediate value, the address or the immediate value calculated in the operand address calculation unit 104 is obtained by passing it through the external bus interface unit 107. In the case where the operand to be operated is in a memory outside the CPU, the bus interface unit outputs the address calculated in the address calculation unit 104 from the address output circuit 108, and the operand fetched from the memory outside the CPU is obtained through the data input/output circuit 109.

Arithmetic units include an ALU 313, a barrel shifter, a priority encoder, a counter, and a shift register. The registers and the main arithmetic units are connected through three buses, and one micro instruction for directing operation between registers is processed in two clocks (one step).

In the case where an access to the memory outside the CPU is required at the data operation, the address is outputted from the address output circuit 108 to the outside of the CPU through the external bus interface unit 107 by the direction of the microprogram, and the aimed data is fetched through the data input/output circuit 109.

In the case where data is stored in the memory outside the CPU, the address is outputted from the address output circuit 108 through the external bus interface unit 107, and simultaneously the data is outputted from the data input/output circuit 109 to the outside of the CPU. In order to efficiently perform operand store, a four-byte store buffer is installed in the data operation unit 106.

In the case where the data operation unit 106 obtains a new instruction address by processing a jump instruction or an exceptional processing, this is outputted to the instruction fetch unit 101 and the PC calculation unit 103.

(2.7) "External Bus Interface Unit"

The external bus interface unit 107 controls communication through the external bus of the data processor of the present invention. All accesses to memories are performed in a clock-synchronized manner, and can be performed in a minimum of two clock cycles (one step).

Access requests to memories are generated independently from the instruction fetch unit 101, the operand address calculation unit 104 and the data operation unit 106. The external bus interface unit 107 mediates these memory access requests. Furthermore, the access to the data located at the memory address striding over the arrangement boundary of 32 bits (one word) which is the size of the data bus connecting the memory to the CPU is performed in a manner that striding over the word boundary is automatically detected in this block and the access is decomposed into memory accesses of two times.

This unit also performs conflict preventing processing and by-pass processing from the store operand to the fetch operand in the case where the operand to be pre-fetched and the operand to be stored are superposed.

(3) "Pipeline Processing Mechanism"

Figure 27:
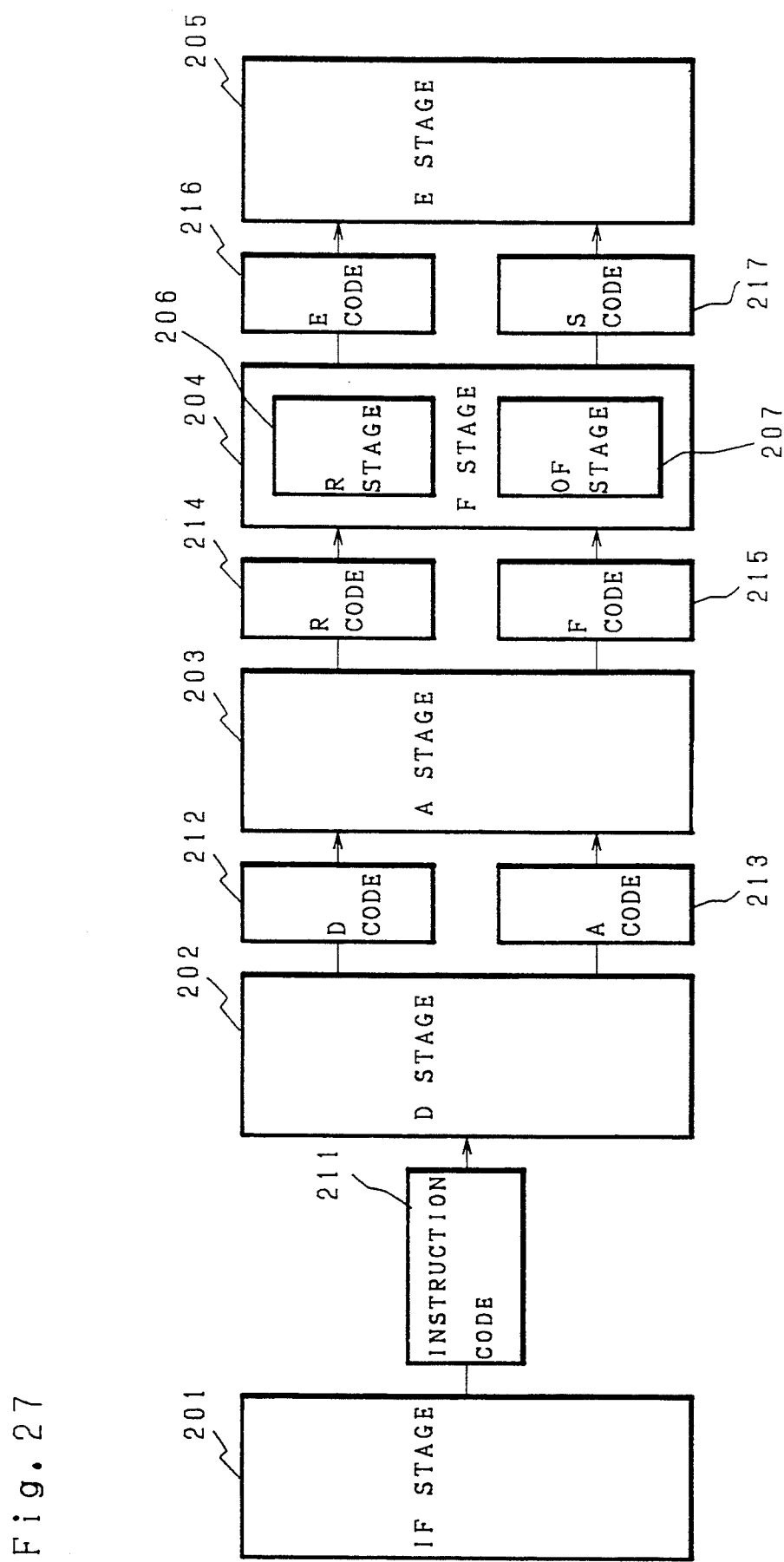
FIG. 27 is a block diagram showing a configuration of a pipeline function of the data processor of the present invention.

FIG. 27 is a schematic diagram showing a pipeline processing mechanism of the data processor of the present invention.

The basis of pipeline processing has a five-stage configuration which comprises an instruction fetch stage (IF stage) 201 for prefetching an instruction, a decoding stage (D stage) 202 for decoding the instruction, an operand address calculation stage (A stage) 203 for performing address calculation of an operand, an operand fetch stage (F stage) 204 consisting of a portion for performing micro ROM access (particularly called a R stage 206) and a portion for prefetch an operand (particularly called an OF stage 207), and an execution stage (E stage) 205 for executing an instruction.

The E stage 205 comprises a one-stage store buffer, and besides, in part of high-function instructions, the execution itself of the instruction is performed in a pipeline manner, and therefore, an actual effect of pipeline processing of five or more stages is obtainable.

Each stage operates independently from the other stages, and theoretically the five stages make perfectly independent operations. Each stage can perform one-time processing in a minimum of two clocks (one step). Accordingly, ideally, the pipeline processing progresses one after another on a two clock (one step) basis.

The data processor of the present invention comprises some instructions which cannot be processed only by the basic pipeline processing of one time such as an operation between memory and memory or a memory indirect addressing, but the data processor of the present invention is designed in such a manner that a balanced pipeline processing can be performed whenever possible for processing of these instructions. For the instruction having a plurality of memory operands, the pipeline processing is performed based on the number of memory operands by decomposing it into a plurality of pipeline processing units (step code) at the decoding stage.

On the decomposing method of the pipeline processing unit, detailed description is disclosed in the Japanese Patent Application Laid-Open No. 63-89932 (1988) to Tatsuga beda et al.

Information transferred from the IF stage 201 to the D stage 202 is an instruction code 211 itself. Information transferred from the D stage 202 to the A stage 203 includes two kinds of information, one on operation designated by an instruction (called a D code 212) and the other on address calculation of operand (called an A code 213).

Information transferred from the A stage 203 to the F stage 204 includes an R code 214 comprising an entry address of a microprogram or a parameter of the microprogram and an F code 215 comprising an operand address and information on directing the method of access.

Information transferred from the F stake 204 to the E stage 205 is an E code 216 comprising operation control information and literal and an S code 217 comprising an operand or an operand address.

EIT detected in the stage other than the E stage 205 does not start the EIT processing until the code thereof reaches the E stage 205. This is because only the instruction processed in the E stage 205 is an instruction at the step of execution, and the instructions having been processed between the IF stage 201 and the F stage 204 do not reach the step of execution yet. Accordingly, for the EIT detected in the stage other than the E stage 205, the detection thereof is recorded in the step code, and it is only transmitted to the following stage.

(3.1) "Pipeline Processing Unit"

(3.1.1) "Classification of Instruction Code Fields"

The pipeline processing unit of the data processor of the present invention is determined by utilizing the feature of the format of an instruction set.

As described in Section (1), the instruction of the data processor of the present invention is a variable-length instruction of two-byte unit, and basically the instruction is configurated by repeating one to three times "a two-byte instruction base part + an addressing extension part of 0 to 4 bytes".

In many cases, the instruction base part comprises an operation code part and an addressing mode designating part, and in the case where index addressing or memory indirect addressing is required, "a two-byte chained addressing mode designating part + an addressing extension part of 0 to 4 bytes" is affixed by an arbitrary number in place of the addressing extension part. The extension part of two or four bytes which is peculiar to the instruction is also affixed lastly depending on the instruction.

The instruction base part comprises an operation code of an instruction, a basic addressing mode, literal and the like. The addressing extension part is any one of displacement, an absolute address, an immediate value and displacement of branch instruction. The extension part peculiar to the instruction comprises a register map, an immediate value designating of the I-format instruction and the like.

Figure 28:
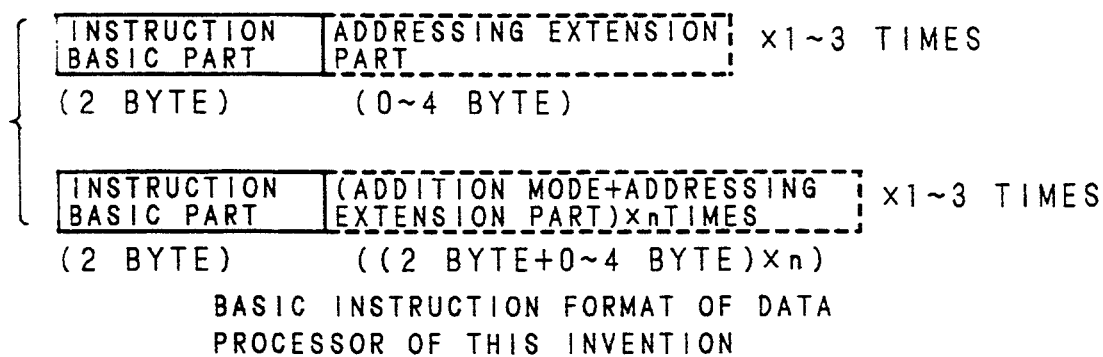
FIG. 28 is a schematic diagram showing a basic instruction format of the data processor of the present invention.

FIG. 28 is a schematic diagram showing the feature of the basic instruction format of the data processor of the present invention.

(3.1.2.) "Decomposition of Instruction into Step Codes"

The data processor of the present invention performs the pipeline processing making the most of the feature of the above-mentioned instruction format.

In the D stage 202, "a two-byte instruction base part + an addressing extension part of 0 to 4 bytes", "a chained addressing mode designating part + an addressing extension part", or an extension part peculiar to the instruction is processed as one decoding unit. The result of decoding of each time is called a step code, and in and after the A stage 203, this step code is taken as a unit of pipeline processing. The number of step codes is peculiar to each instruction, and in the case where the chained addressing mode designating is not performed, one instruction is divided into a minimum of one step code to a maximum of three step codes. In the case where the chained addressing mode designating is performed, the number of step codes is increased by a number as required. Note that this is performed only in the decoding step as described later.

(3.1.3) "Control of Program Counter"

All of the step codes existing on the pipeline of the data processor of the present invention have a possibility of being the ones for another instruction, and for this reason, the value of the program counter is controlled on a step code basis. All of the step codes have the program counter value of the instruction whereon that step code is based. The program counter value flowing through each stage of the pipeline while accompanying the step code is called a step program counter (SPC). The SPC is transferred sequentially from one pipeline stage to the other.

(3.2) "Processing of Each Pipeline Stage"

As shown in FIG. 27, for convenience sake, names are given to the input and output step codes of each pipeline stage. The step codes perform processing relating to the operation codes, and include two series; a series becoming entry addresses of microprograms and parameters for the E stage 205 and a series becoming operands for micro-instructions of the E stage 205.

(3.2.1) "Instruction Fetch Stage"

The instruction fetch stage (IF stage) 201 fetches an instruction from the memory or the branch buffer and input it to the instruction queue 301, and outputs an instruction code to the D stage 202. Input of the instruction queue 301 is performed in an aligned four-byte unit. In the case where an instruction is fetched from the memory, a minimum of two clocks (one step) are required for the aligned four bytes. In the case where the branch buffer hits, fetching can be made in one clock per aligned four bytes. The output unit of the instruction queue 301 is variable on a two-byte basis, and a maximum of six bytes can be outputted during two clocks. Immediately after a branch, two bytes of the instruction base part can also be transferred directly to the instruction decoder by by-passing the instruction queue 301.

Control of registering, clearing and the like of the instruction to the branch buffer, management of addresses of the instructions to be prefetched and control of the instruction queue are also performed in the IF stage 201.

The EITs detected in the IF stage 201 include a bus access exception in fetching an instruction from the memory or an address conversion exception due to memory protection violation.

(3.2.2) "Instruction Decoding Stage"

The instruction decoding stage (D stage) 202 decodes an instruction code inputted from the IF stage 201. Decoding is performed by two clock (one step) basis using the first decoder 303 consisting of the FHW decoder, the NFHW decoder and the addressing mode decoder in the instruction decoding unit 102, and an instruction code of 0 to 6 bytes is consumed in the decoding processing of one-time (no instruction code is consumed in the outputting processing of the step code comprising the return address of the RET instruction). By one-time decoding, the control code which is the A code 213 as address calculation information, address modification information, the control code which is the D code 212 as the result of intermediate decoding of the operation code, and eight-bit literal information are inputted to the A stage 203.

In the D stage 202, control of the PC calculation unit 103 of each instruction, branch prediction processing, prebranch processing for the pre-branch instruction and outputting processing of the instruction code from the instruction queue 301 are also performed.

The EITs detected in the D stage 202 include a reserve instruction exception and an odd address jump trap at prebranch. Various EITs transferred from the IF stage 201 are also transferred to the A stage 203 through processing of encoding into the step code.

(3.2.3) "Operand Address Calculation Stage"

Processing functions of the operand address calculation stage (A stage) are roughly divided into two parts. One is processing for post-decoding of the operation code using the second decoder 305 of the instruction decoding unit 102 and the other is for calculation of operand address in the operand address calculation unit 104.

The post-decoding processing of the operation code inputs the D code 212 and outputs the R code 214 comprising write reserve of register and memory, entry address of microprogram and parameters for microprogram. In addition, the write reserve of the register or memory is for preventing a wrong address calculation by re-writing the content of the register or memory referred in the address calculation with the instruction preceding on the pipeline.

To avoid a dead lock, the write reserve of the register or memory is performed on an instruction basis rather than on a step code basis.

On the write reserve to the register or memory, detailed description is disclosed in the Japanese Patent Application No. 62-144394 (1987) to Yuuichi Saito, et al, and corresponding to U.S. Pat. No. 4,907,147.

The operand address calculation processing inputs the A code 21S, performs addition in the operand address calculation unit 104 according to the A code 218 or performs address calculation by combining memory indirect reference, and outputs the result of the calculation as the F cord At this time, conflict check is done in reading-out of the register and the memory attending on the address calculation, and if a conflict is indicated because the preceding instruction has not completed the writing processing to the register or the memory, the processing waits until the preceding instruction completes the write processing in the E stage 208. Checking is made for whether or not the operand address and the address of memory indirect reference can enter the I/O area mapped in the memory.

The EITs detected in the A stage 208 include reserve instruction exception, privilege instruction exception, bus access exception, address conversion exception and debugging trap generated by an operand break point hit at memory indirect addressing. When it is indicated that the D code 212 or the A code 213 itself has caused EIT, the A stage 203 does not perform address calculation processing for that code, and that EIT is transmitted to the R code 214 and the F code 215.

(3.2.4) "Micro ROM Access Stage"

Processing of the operand fetch stage (F stage) 204 is also divided roughly into two parts. One is access processing of the micro ROM, particularly called the R stage 206. The other is operand prefetch processing, particularly called the OF stage 207. The R stage 206 and the OF stage 207, which do not necessarily operate at the same time, operate independently depending on whether or not the memory access right can be acquired.

The micro ROM access processing which is the processing of the R stage 206 is the micro ROM access and micro instruction decoding processing for generating the E code 216 which is an execute control code used for execution in the following E stage 205 for the R code 214. In the case where processing for one R code 214 is decomposed into two or more microprogram steps, the micro ROM is used in the E stage 205, and the following R code 214 waits for micro ROM access. The micro ROM access to the R code 214 is performed when the last micro instruction is executed in the preceding E stage 205. In the data processor of the present invention, almost all of the basic instructions are executed in one microprogram step, therefore, there are many actual cases that the micro ROM access to the R code 214 is performed one after another.

There is no EIT to be detected anew in the R stage 206.

When the R code 214 indicates the EIT of instruction processing re-execution type, the microprogram for that EIT processing is executed, and therefore the R stage 206 fetches the micro instruction according to the R code 214. In case where the R code 214 indicates an odd address jump trap, the R stage 206 transmits it through the E code 216. This is for pre-branch, and in the E stage 205, if no branch is made in that E code 216, an odd address jump trap is generated with the pre-branch being to be effective.

(3.2.5) "Operand Fetch Stage"

The operand fetch stage (OF stage) 207 performs the operand prefetch processing among the above-mentioned two processings performed in the F stage 204.

The operand prefetch processing inputs the F code 215 and outputs the fetched operand and the address thereof as the S code 217. One F code 215 may stride over the word boundary, but designates operand fetching of four bytes or less. The F code 215 also comprises designating of whether or not access to the operand is to be performed, and in the case where the operand address itself or the immediate value calculated in the A stage 203 is transferred to the E stage 205, no operand prefetch is performed, and the content of the F code 215 is transferred as the S code 217. In the case where the operand intended to be prefetched coincides with the operand intended to be write-processed in the E stage 205, no operand prefetching is performed from the memory, but being performed by by-passing it. For the I/O area, the operand prefetch is delayed, and the operand fetch is performed only after all the preceding instructions have been completed.

The EITs detected in the OF stage 207 include a bus access exception, an address conversion exception, and a debugging trap generated by a break point hit to the operand prefetch. When the F code 215 indicates an EIT other than the debugging trap, it is transferred to the S code 217, and no operand prefetch is performed. When the F code 215 indicates a debugging trap, the same processing as the case where no EIT is indicated for that F code 215 is performed, and the debugging trap is transmitted to the S code 217.

(3.2.6) "Execution Stage"

The execution stage (E stage) 208 operates with the E code 216 and the S code 217 taken as inputs. This E stage 205 is a stage for executing instructions, and the whole processings performed in the stages before and in the F stage 204 are pre-processings for the E stage 205. In the case where a jump instruction is executed in the E stage 205 or the EIT processing is started, all the processings from the IF stage 201 to the F stage 204 are disabled. The E stage 205 is controlled by microprograms, and the instruction is executed by executing a series of microprograms starting with the entry address of microprogram indicated in the R code 214.

Read of the micro ROM and execution of the microinstruction are performed in a pipeline manner. Accordingly, in the case where a branch takes place in the microprogram, a gap (blank) of one microstep is generated. The E stage 205 can also perform pipeline processing of an operand store of four bytes or less and the following microinstruction execution by utilizing the store buffer in the data operation unit 106.

In the E stage 205, the write reserve to the register and the memory performed in the A stage 203 is released after write of the operand.

In the case where a conditional branch instruction generates a branch in the E stage 205, the branch prediction for that conditional branch instruction has been wrong, and therefore rewriting of the branch history is performed.

The EITs detected in the E stage 205 include bus access exception, address conversion exception, debugging trap, odd address jump trap, reserve function exception, wrong operand exception, reserve stack format exception, zero division trap, unconditional trap, conditional trap, delayed context trap, external interruption, delayed interruption, reset interruption and system faults.

The EITs detected in the E stage 205 are all EIT-processed, but the EITs which are detected between the IF stage 201 and the F stage 204 before the E stage and are reflected in the R code 214 or the S code 217 are not necessarily EIT-processed. All the EITs which are detected among from the IF stage 201 to the P stage 204, but do not reach the E stage 205 because the preceding instruction has executed a jump instruction in the E stage 205 or the like are all canceled. The instruction having caused that EIT is assumed to have not been executed from the beginning.

The external interruption and the delayed interruption are accepted directly to the E stage 205 at a pause of the instruction, and necessary processing is executed by microprograms. Processings of other various EITs are performed by microprograms.

(3.3) "Status Control of Each Pipeline Stage"

Each stage of the pipeline has an input latch and an output latch, and is based on operation independent of other stages. Each stage starts the next processing after such whole processes as the one-preceding processing has been completed, the result of that processing has been transferred from the output latch to the input latch of the next stage, and all input signals required for the next processing have been prepared in the input latch of the stage of its own.

This means that each stage starts the next processing after such whole processes as all the input signals to the next processing outputted from the one-preceding stage are enabled, the result of the current processing is transferred to the input latch of the post-stage, and the output latch becomes empty.

It is required that all input signals are prepared at a timing with one clock before the operation start in each stage. If the input signals are not all prepared, that stage is put in the waiting state (input waiting). If transfer from the output latch to the input latch of the next stage is done, it is required that the input latch of the next stage is in the empty state, and when the input latch of the next stage is not empty, the pipeline stage is also put in the waiting state (output waiting). If the required memory access right cannot be acquired, or wait is inserted into the memory access under processing, or another pipeline conflict occurs, the processing itself of each stage is delayed.

(4) "Processing Sequence of POP Instruction"

For the data processor as described above, further detailed description is made on how the POP instruction is processed on the pipeline in the cases where destination is memory-designated and register-designated in reference to drawings.

In addition, following description is an example in which an addressing mode is a register indirect addressing mode in the case where a destination operand specifies a memory.

Figure 29:
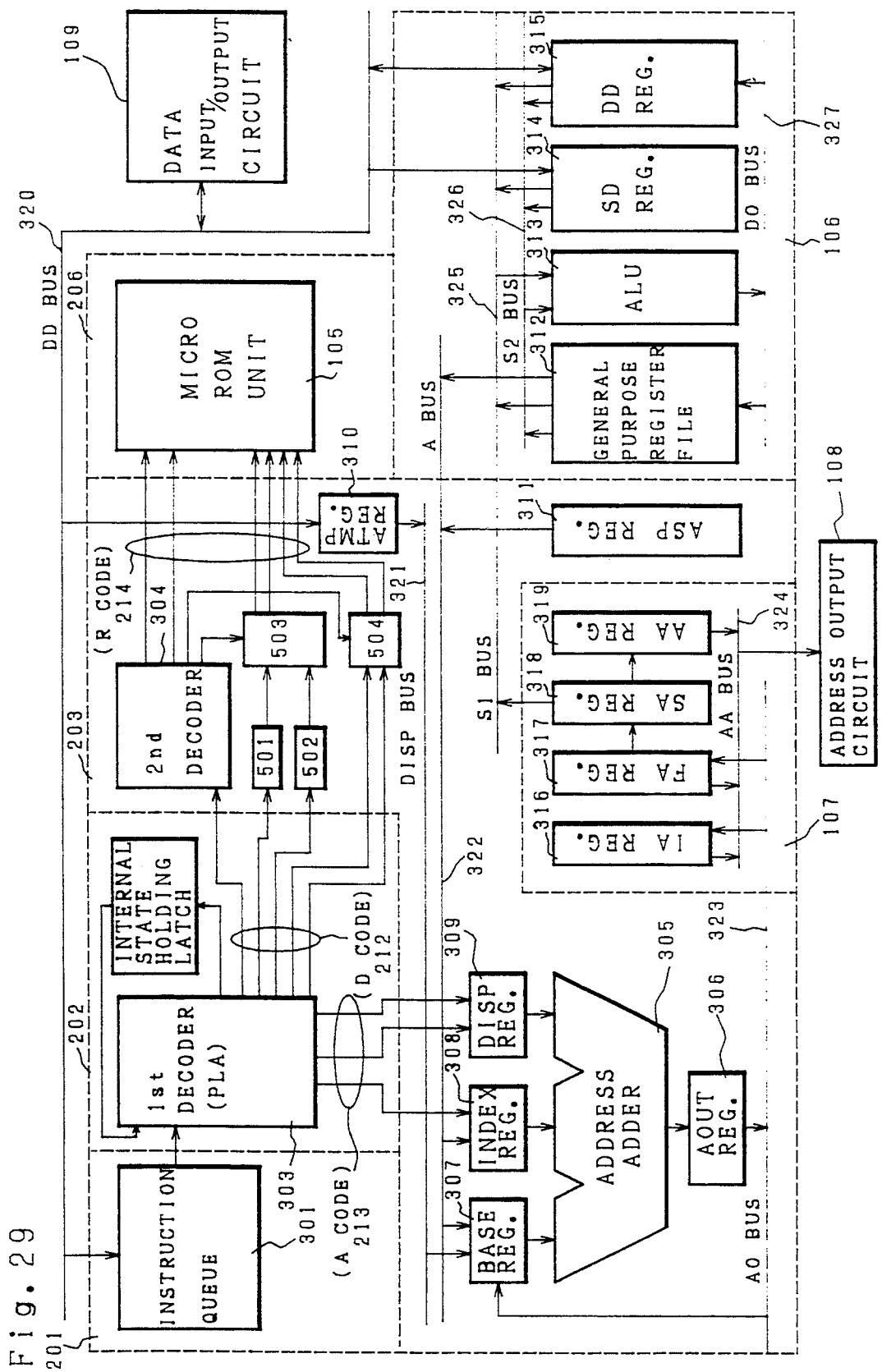
FIG. 29 is a block diagram showing a further detailed configuration of the data processor of the present invention.

FIG. 29 is a block diagram showing a further detailed configuration of the data processor of the present invention.

The instruction queue 301 is comprised in the instruction fetch unit 101, and relates to the processing of the IF stage 201.

The first decoder 303 is located in the instruction decoding unit 102, and relates to the processing of the D stage 202.

The first decoder 303 is configured with a PLA (Programmable Logic Array). When the instruction code 211 is inputted to the D stage 202, it is decoded by the first decoder 303, and the D code 212 and the A code 213 are generated and outputted.

The D code 212 is given to the portion performing the processing of the A stage 203 in the instruction decoding unit 102, and the A code 213 is given to the portion performing the processing of the A stage 203 in the operand address calculation unit 104, respectively.

In addition, numeral 401 designates an inner state holding latch.

Figure 31:
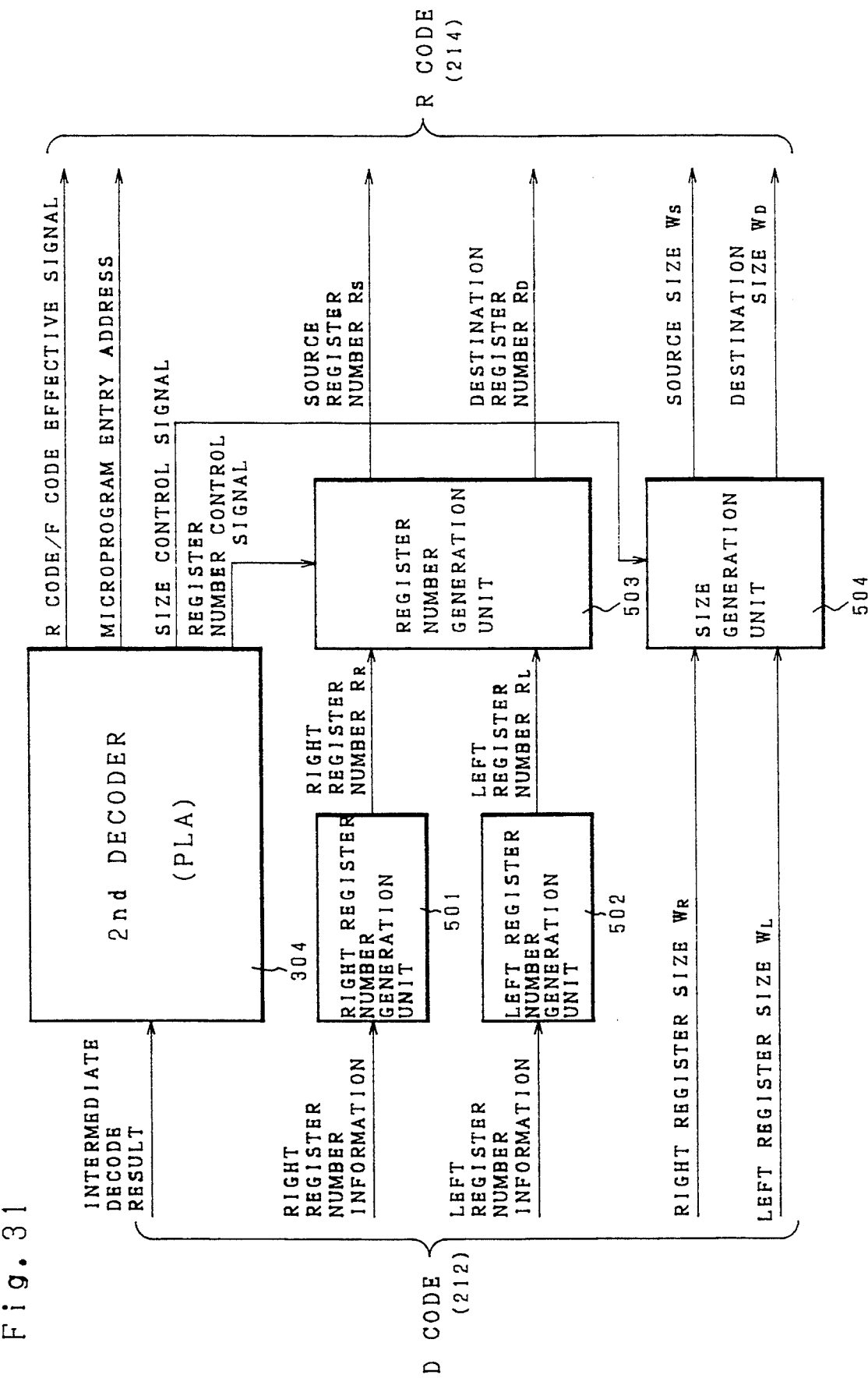
FIG. 31 is a block diagram showing a configuration of a portion which is an operand address calculation (A) stage and is comprised in an instruction decoding unit of the data processor of the present invention.

The second decoder 304 and an ATMP register 310 are located in the instruction decoding unit 102, and relates to the processing of the A stage 203. In addition, detail of the A stage is shown in FIG. 31. The ATMP register 310 is used for holding the data read by memory access at memory indirect reference.

The address adder 305, an AOUT register 306, a BASE register 307, an INDEX register 308 and a DISP register 309 are comprised in the operand address calculation unit 104, and relate to the processing of the A stage 203. The BASE register 307, the INDEX register 308 and the DISP register 309 are registers for holding the base value, the index value and the displacement value, respectively. The address adder 305 simultaneously adds the values of the BASE register 307, the INDEX register 308 and the DISP register 309. The AOUT register 306 is a register for holding the output of the address adder 305.

An ASP register 311 is comprised in a stack pointer calculation unit, and relates to the processing of the A stage 203.

In order to prevent a conflict of SP value due to a POP operation from the stack or a PUSH operation to the stack and the like, in the A stage 203, there is controlled the ASP value which is the SP value of the A stage preceding the SP value of the E stage 205. Renewal of the SP value attending on the POP operation and the PUSH operation is performed by controlling the ASP value in the A stage. Accordingly, by referring to the ASP value processing can be made to progress without generating a delay of processing the step code caused by a conflict of SP value even immediately after normal POP operation or PUSH operation. The ASP register 311 holds this ASP value.

In addition, on the method of controlling the SP value, detailed disclosure is made in the Japanese Patent Application No. 62-145852 (1987).

The micro ROM unit 105 comprising a micro ROM, a micro sequencer, a microinstruction decoder and the like relates to the processing of the R stage 206.

A general-purpose register file 312, an ALU 313, an SD register 314, and a DD register 315 are comprised in the data operation unit 106, and relate to the processings of the OF stage 207 and the E stage 208. The SD register 314 is a register for holding the data read by memory access at operand fetching. The DD register 315 is a register for holding the data to be read or stored for the E stage 205 by memory access.

An IA register 316, an FA register 317, an SA register 318 and an AA register 319 are part of the external bus interface unit 107. The IA register 316 is a register for setting the address when the A stage 208 performs memory access at memory indirect reference. The FA register 317 is a register for setting the address when the OF stage 207 performs memory access at fetching of the operand. The AA register 319 is a register for setting the address when the E stage 205 reads or stores data by memory access.

The OF stage 207 sends the operand-fetched data and the address thereof to the E stage 205, and the SA register 318 holds the address to be sent at that time. The SA register 318 not only sends the address but also is used in the case of sending the immediate value.

In addition, buses of the data processor of the present invention include a DD bus 320, a DISP bus 321, an A bus 322, and an AO bus 323, an AA bus 324, an S1 bus 325, an S2 bus 326 and a DO bus 327.

FIG. 31 is a block diagram showing a configuration of the portion performing the processing of the A stage 203 in the instruction decoding unit 102.

This portion is configured with the second decoder 304, a right register number generating unit 501, a left register number generating unit 502, a register number generating unit 503, a size generating unit 504 and the like. In addition, the second decoder 304 is configured with the PLA likewise the first decoder 303.

The D code 212 to be inputted is configured with the result of intermediate decoding of the operation code, right register number information, left register number information, a right register size $W_R$, a left register size $W_L$ and the like.

The right register number information and the left register number information are inputted to the right register number generating unit 501 and the left register number generating unit 502, respectively, and generate a right register number $R_R$ and a left register number $R_L$, respectively. The right register number information comprises information showing that the operand is any one of a value in the register, a literal, a value in the memory and an immediate value. The left register number information comprises information showing that the operand is either a value in the register or a literal.

The right register number $R_R$ and the left register number $R_L$ correspond to a first register designating unit and a second register designating unit in the instruction format, respectively, and locations to store a first operand and a second operand are designated by those register numbers, respectively. For an example, the R-Format instruction as shown in FIG. 4 is given. Symbol Rn shows the first register designating unit corresponding to the right register number $R_R$, and symbol Rm shows the second register designating unit corresponding to the left register number $R_L$.

In the instruction format, it is not determined in one meaning that which of the first operand designating unit and the second operand designating unit is the source or the destination. For this reason, which of the right register number $R_R$ and the left register number $R_L$ becomes the source register number $R_S$ or the destination register number $R_D$ is determined by a register number control signal which is an output of the second decoder 304 in the register number generating unit 503.

In the size generating unit 504 having being given a size control signal which is an output of the second decoder 304, the right register size $W_R$ which is a data size of the register shown by the right register number $R_R$ and the left register size $W_L$ which is a data size of the register shown by the left register number $R_L$ are determined by the source size $W_S$ and the destination size $W_D$.

In the F stage 204, it is recognized by a R code/F code enable signal which is an output of the second decoder 304 that the R code 214 and the F code 215 have been transferred to the F stage 204.

Figure 30A:
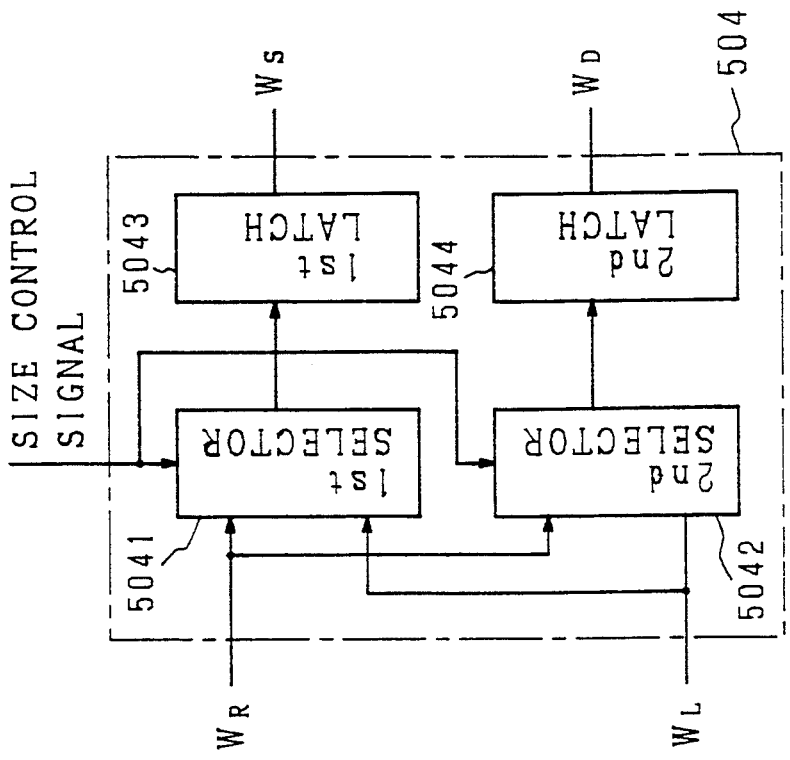
FIG. 30(a) is a block diagrams showing a configuration of a register number generation unit of the present invention.
Figure 30B:
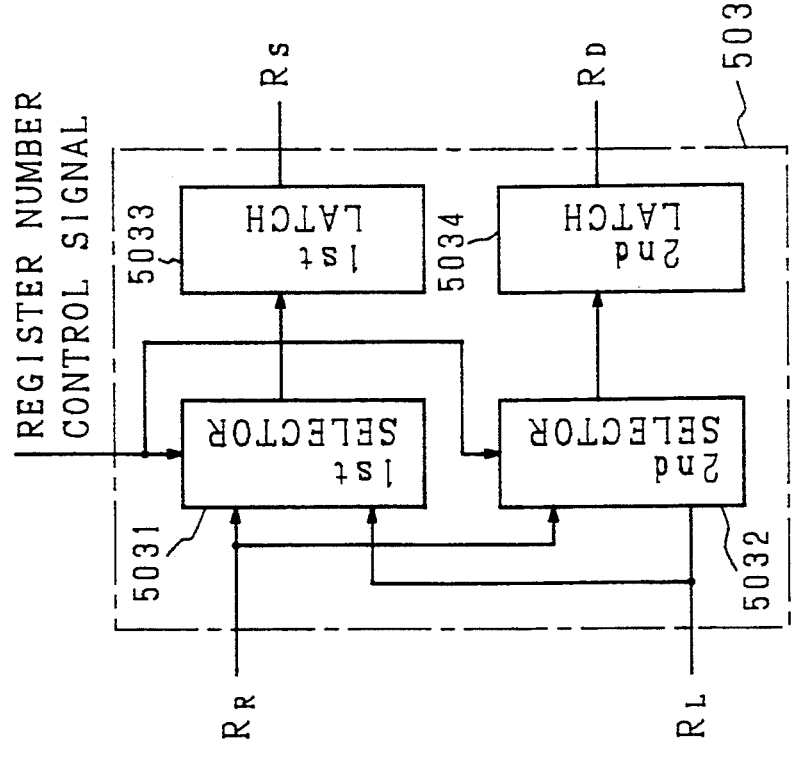
FIG. 30(b) is a block diagrams showing a configuration of a size generation unit of the present invention.

FIGS. 30(a) and (B) are block diagrams showing configurations of the register number generation unit 503 and the size generation unit 504, respectively.

The right register number $R_R$ is inputted to a first selector 5031. The left register number $R_L$ is inputted to a second selector 5032. The register number control signal is inputted to both the selectors 5031 and 5032. The right register number $R_R$ and the left register number $R_L$ are latched in first latch 5033 and second latch 5034 corresponding to the register number control signal and outputted as the source register number $R_S$ and destination register number $R_D$.

The right register size $W_R$ is inputted to a first selector 5041. The left register size $W_L$ is inputted to a second selector 5042. The size control signal is inputted to both the selectors 5041 and 5042. The right register size $W_R$ and the left register size $W_L$ are latched in first latch 5043 and second latch 5044 corresponding to the size control signal and outputted as the source register size $W_S$ and destination register size $W_D$.

Figure 32:
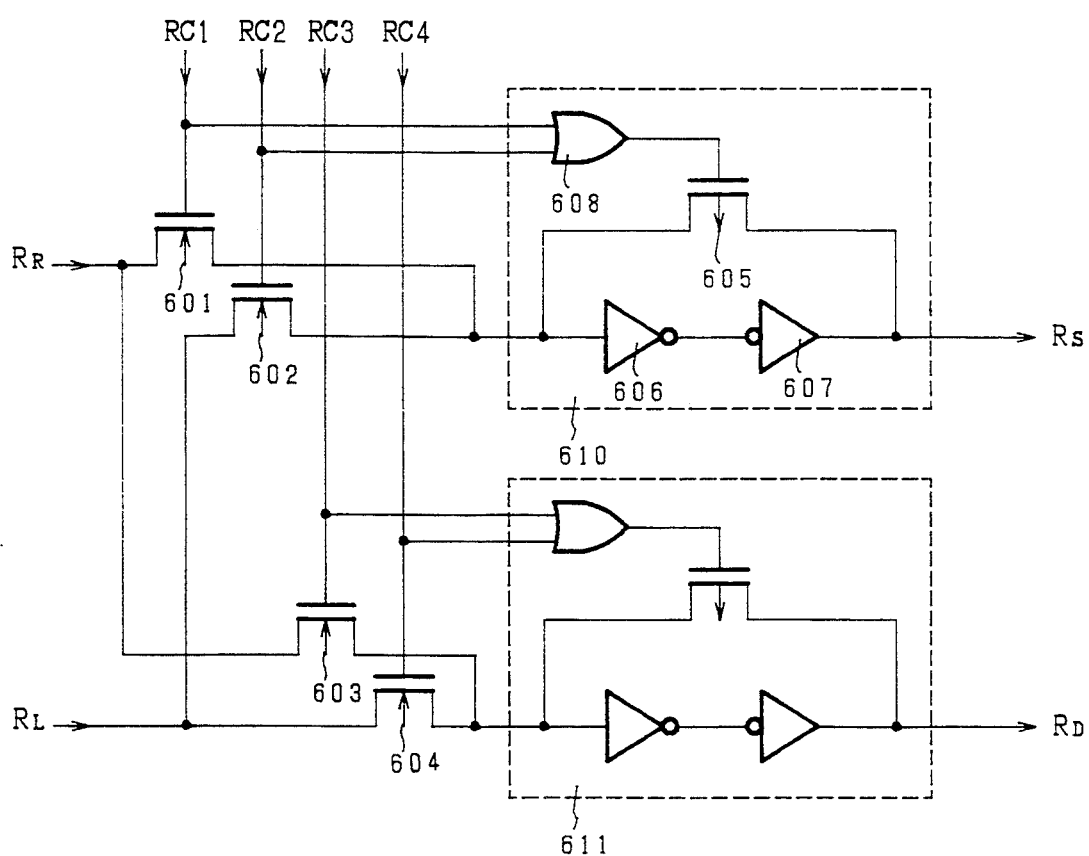
FIG. 32 is a circuit diagram showing a configuration of a register number generating unit in FIG. 31.
Figure 33:
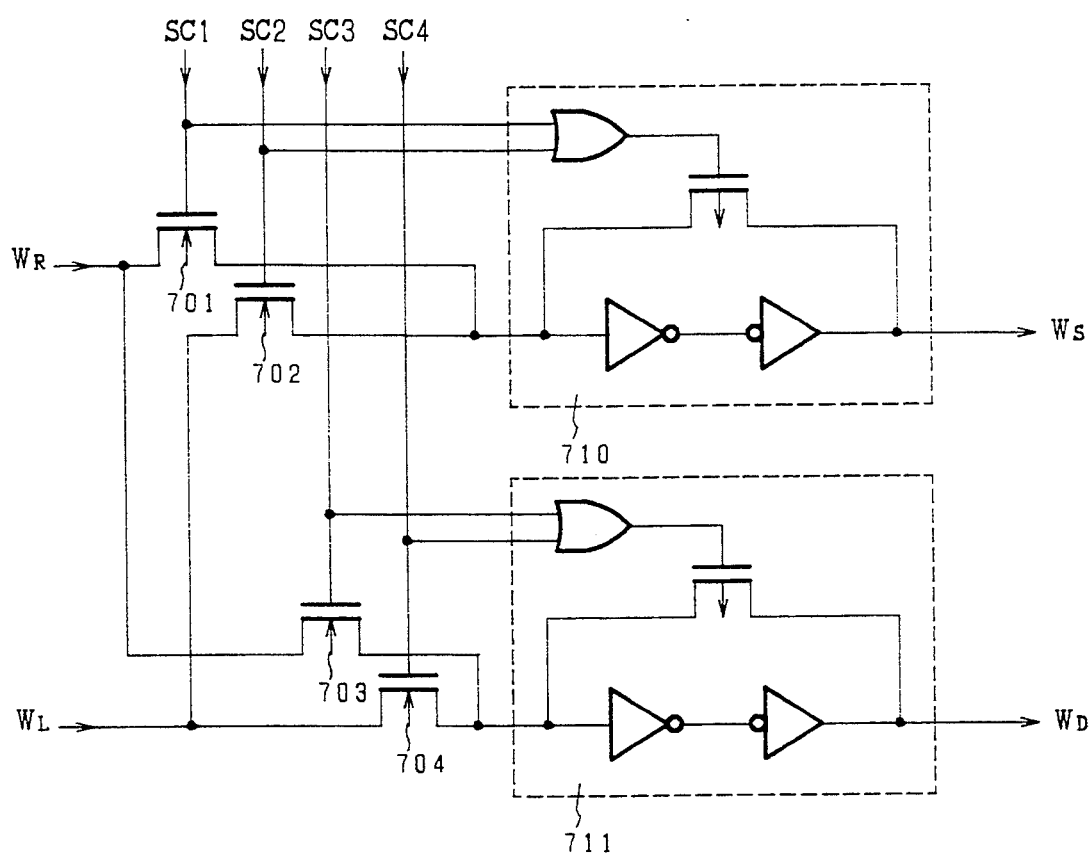
FIG. 33 is a circuit diagram showing a configuration of a size generating unit in FIG. 31.

FIG. 32 and FIG. 33 are circuit diagrams showing configurations of the register number generating unit 503 and the size generating unit 504, respectively.

Input signals RC1, RC2, RC3 and RC4 in FIG. 32 are register number control signals outputted by the second decoder 304. Input signals SC1, SC2, SC3 and SC4 in FIG. 33 are size control signals outputted by the second decoder 304.

Numerals 601, 602, 603, 604, 701, 702, 703 and 704 designate N-channel transmission gates (TG) respectively, numeral 605 designates a P-channel TG, numerals 606 and 607 designate inverters, and numeral 608 designates an OR gate. The respective circuits are configurated with a latch wherein an input gate is a selector. A circuit 610 is configured with the P-channel TG 605, the inverter 606, the inverter 607 and the OR gate 608. Each circuit 611, 710 and 711 have configurations equivalent to the circuit 610.

In addition, in FIG. 32 and FIG. 33, circuits for one bit are shown to be simplified. However, the signal indicating the register number and the signal indicating the size are of five bits and two bits respectively, and actually each configuration is made with a circuit of a corresponding bit number.

FIG. 34 is a table showing the contents of the R code/F code output control signal, the register number control signal and the size control signal which are outputs of the second decoder 304 as shown in FIG. 31 in executing the POP instruction.

Figure 35A:
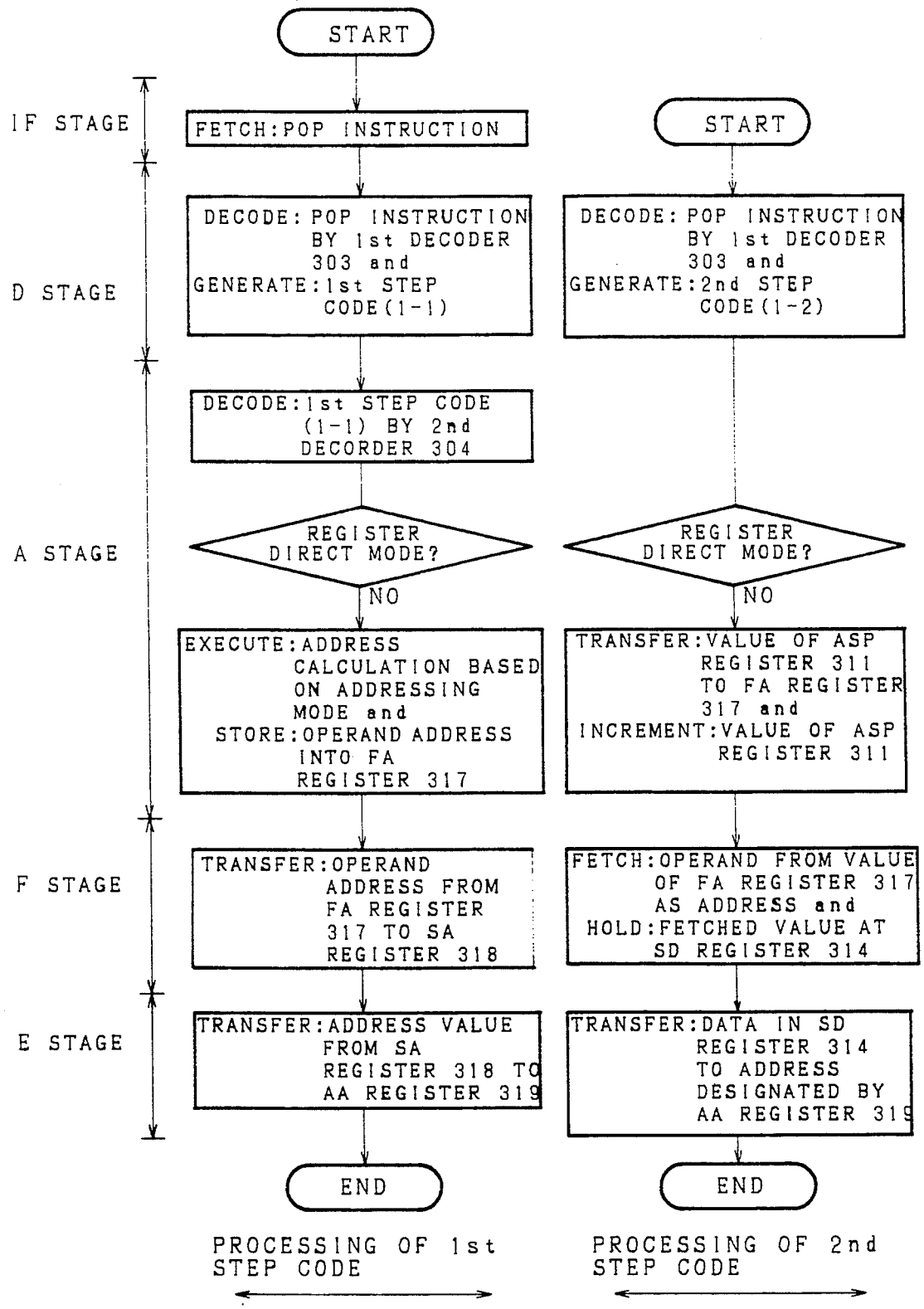
Figure 35B:
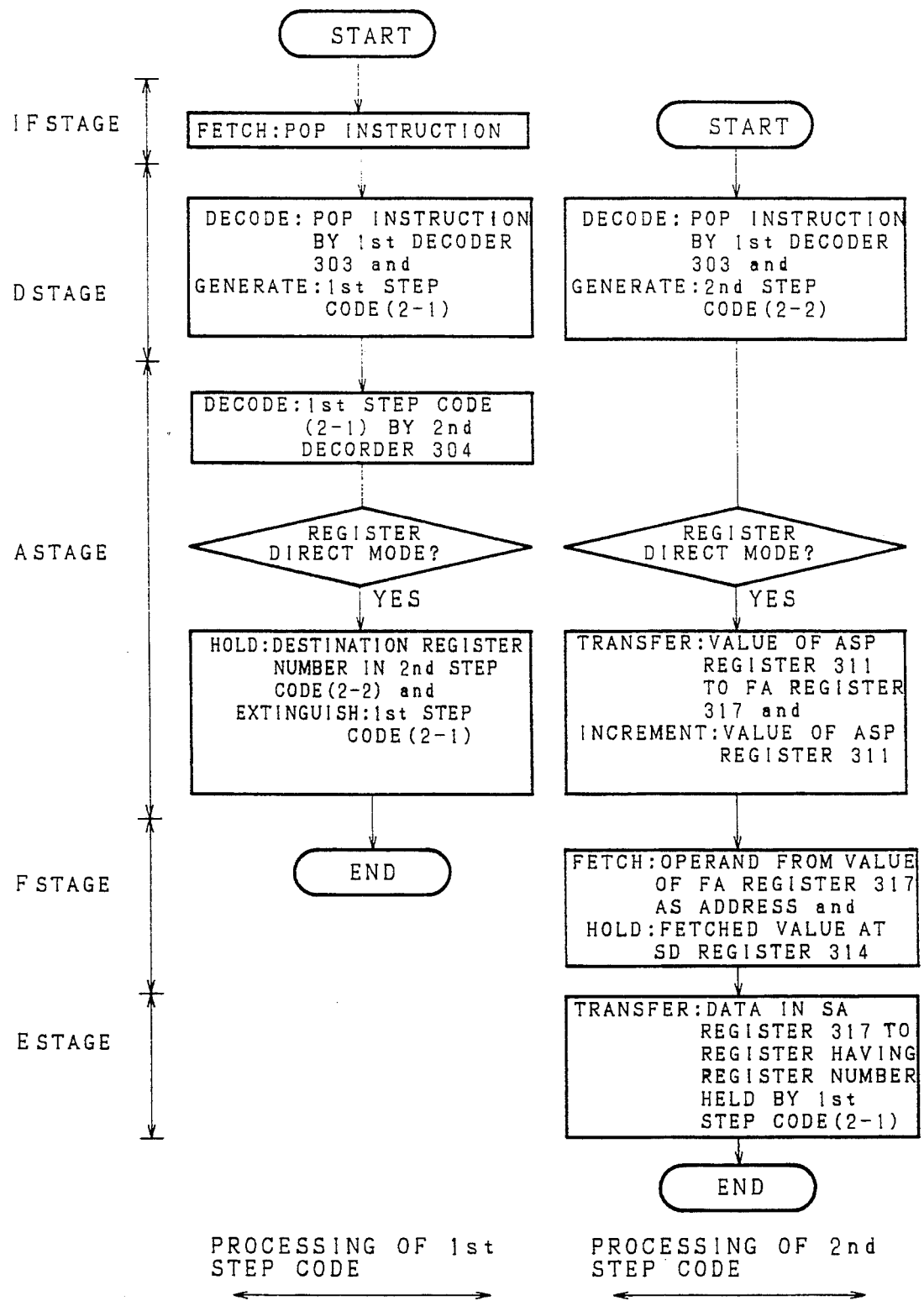

FIGS. 35(a) and (b) are flowcharts showing a processing sequence of the POP instruction on the pipeline. FIG. 35(a) is a flowchart wherein destination is memory-designated. FIG. 35(b) is a flowchart wherein destination is register-designated.

Figure 36A:
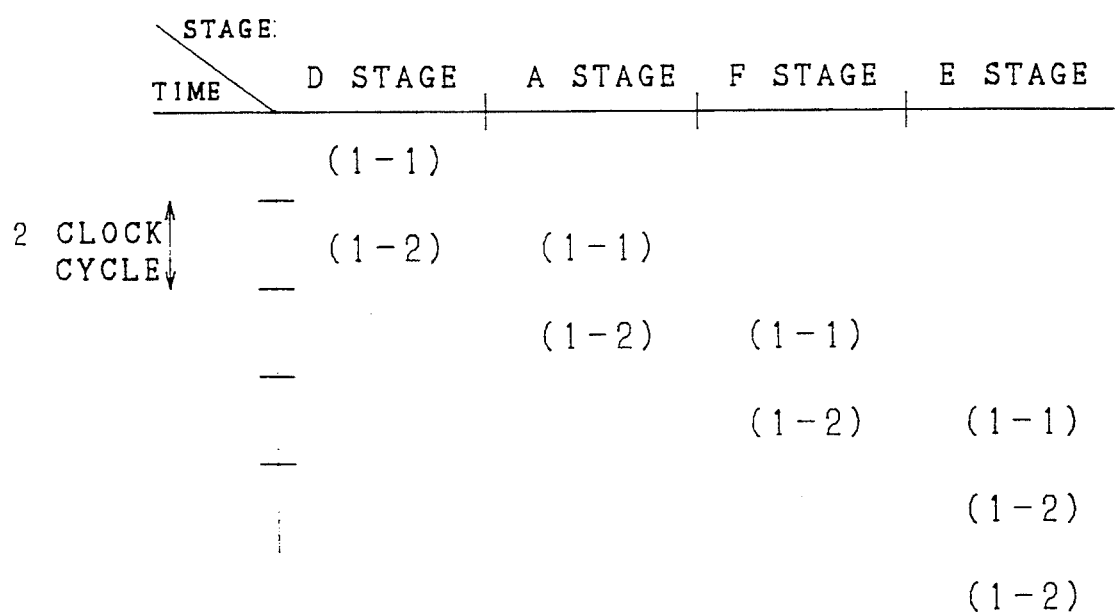

FIGS. 36(a), (b), (c) and (d) are schematic diagrams showing flows of the step code processing in and after the D stage in processing the POP instruction. In the diagrams, the ordinate represents time and one division is equivalent to two clocks (one step).

FIGS. 36(a) and (b) show the cases where destination is memory-designated and register-designated respectively, and show flows of the step code processing in the case where no waiting state is present on the pipeline.

Figure 36B:
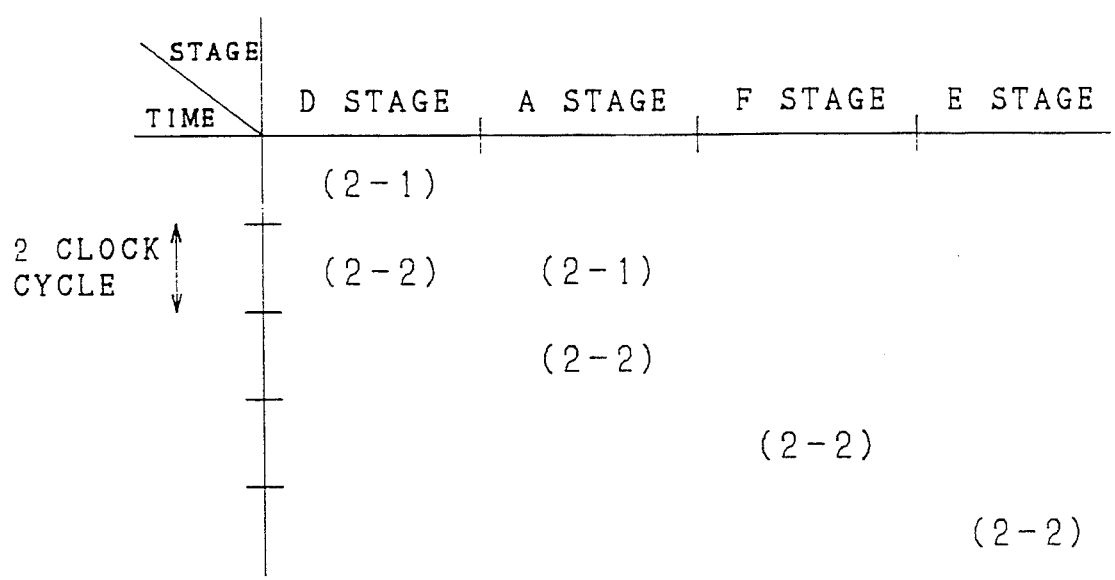
Figure 36C:
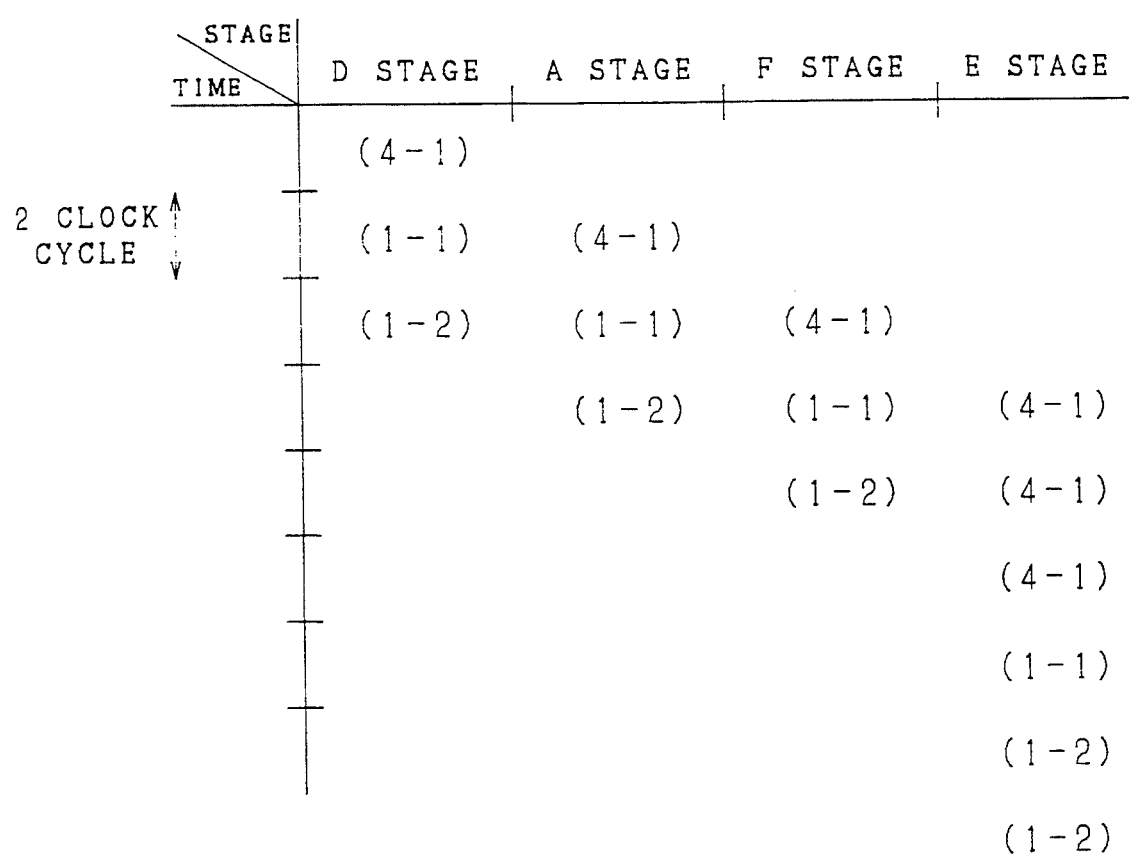

FIGS. 36(c) and (d) show the cases where destination is memory-designated and register-designated respectively, and show flows of the step code processing in the case where six clocks (three steps) is required in the E stage 205 for the step code processing immediately before the POP instruction, and consequently the waiting state has occurred in the step code of the POP instruction.

Figure 37A:
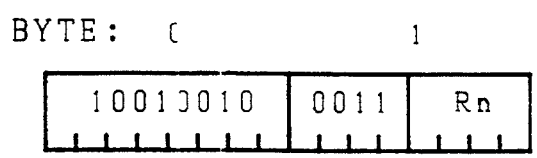
Figure 37B:
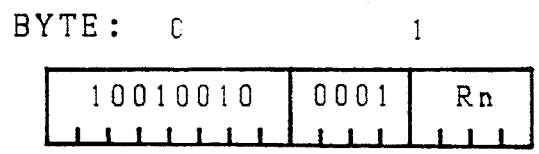

FIGS. 37(a) and (b) are schematic diagrams showing instruction formats of the POP instruction. The instruction format of the POP instruction is the G1-Format as shown in FIG. 7. FIG. 37(a) shows the case of register indirect addressing. The general-purpose register number Rn designated here shows the general-purpose register to be referred. FIG. 37(b) shows the case of register direct addressing. The general-purpose register number Rn designated here shows the general-purpose register to become destination.

Since the POP instruction is an instruction transferring data on the stack top to the memory or the register, it is virtually equal to the transfer instruction between memory and register or between memory and memory. Then, in the data processor of the present invention, configuration is made in a manner that the step code for processing the source operand part is generated despite the absence of the source operand designated part, and all the required preprocessings are performed before the E stage.

Hereinafter, description is made in reference to the flowcharts in FIGS. 35(a) and (b).

(4.1) "Where Memory is designated as Destination"

First, the IF stage 201 fetches the POP instruction from the memory and inputs it to the instruction queue 301, and outputs the instruction code 211 of the POP instruction to the D stage 202.

The D stage decodes the POP instruction fetched in the IF stage 201 by the first decoder 303.

The instruction code 211 of the POP instruction is inputted to the first decoder 303 and is decoded, and a first step code (1-1) of the POP instruction is generated. Part of the results of the decoding is held in an inner state holding latch 401 as an inner state signal.

In the next decoding cycle, in response to the inner state signal from the inner state holding latch 401, the first decoder 303 generates a second step code (1-2) of the POP instruction without taking-in the instruction code 211 from the IF stage 201. Thus, the two step codes are generated as shown in FIG. 35(a).

Although no source operand designating part is present in the POP instruction, it is implied that the source operand is a stack top as a function of the instruction. Accordingly, in the data processor of the present invention, in the stage where the POP instruction has been decoded, a step code (1-2) for preliminarily performing the processing relating to the source operand is generated.

Each step code outputted from the D stage 202 is configurated with the A code 213 and the D code 212. The A code 213 and the D code 212 in the same step code are simultaneously sent to the A stage 203. The step codes generated from the POP instruction are sent to the A stage 203 in the sequence of the step code (1-1) and the step code (1-2).

Processings in the following stages are described relating to each step code.

(4.1.1) "Processing of the First Step Code (1-1) of POP Instruction"

The A stage 203 inputs the A code 213 and the D code 212.

When the A code 213 is inputted to the A stage 203, in the A stage 203, address calculation is performed by controlling a control signal of the A code 213. By information of the register to be referred, the value in the general-purpose register to be referred in the general-purpose register file 312 is stored in the BASE register 307 from the A bus 322. The INDEX register 308 and the DISP register 309 are cleared by a control signal included in the A code 213 of the step code (1-1). The values of these three registers are added by the address adder 305, and the result thereof is stored in the AOUT register 306. Furthermore, the value in the AOUT register 306 is sent to the FA register 317 through the AO bus 323. The value from the general-purpose register to be referred in the FA register 317 becomes the F code 215 together with part of the output of the second decoder 304.

As shown in FIG. 34, when the second decoder 304 inputs the result of intermediate decoding of the D code 212, it generates entry addresses of microprograms or various control information.

Also, the right register number information and the left register number information in the D code 212 are inputted respectively to the right register number generating unit 501 and the left register number generating unit 502, and the right register number $R_R$ and the left register number $R_L$ are generated. In the step code (1-1) of the POP instruction, only the right register number $R_R$ is valid, and indicates the SD register 318. The right register size $W_R$ indicates a word.

The control information outputted from the second decoder 304 comprises a register number control signal and a size control signal.

The register control signal indicates that the right register number $R_R$ corresponds to the destination register number $R_D$. The size control signal indicates that the right register size $W_R$ corresponds to the destination register size $W_D$.

Among the register number control signals RC1, RC2, RC3 and RC4, only the signal RC3 is enabled, and only the N-channel TG 603 is turned on, and the right register number $R_R$ is held as the destination register number $R_D$ in the second latch 5034. Also, among the size control signals SC1, SC2, SC3 and SC4, only the SC3 is enabled, and only the N-channel TG 703 is turned on, and the right register size $W_R$ is held as the destination register size $W_D$ in the second latch 5044.

Thus, in the step code (1-1), the destination register number $R_D$ shows the SD register 318, and the destination register size $W_D$ shows a word.

The R code 214 is generated from these entry addresses of microprograms, the register number and the like.

The R code 214 and the F code thus generated are sent simultaneously to the F stage 204.

When the R code/F code enable signal is enabled, the R stage 206 inputs the R code 214, and accesses to the micro ROM 105 by the entry address of the microprogram comprised in the R code 214. Output of the micro ROM 105 is decoded, and becomes the E code 216 along with the register number and the like. The register shown by the destination register number $R_D$ of this E code 216 is the SD register 314, and the destination register size $W_D$ is a word.

When the R code/F code enable signal is enabled, the 0F stage 207 inputs the F code 215, and the value in the FA register 317 which is part of the F code 215 is transferred to the SA register 318. The value in the SA register 318 is sent to the E stage 205 as the S code 217.

When the E code 216 and the S code 217 are inputted to the E stage 205, processing of "store the value in the SA register 318 into the AA register 319" is performed. In this case, the register shown by the destination register number $R_D$ is the SD register 314, but this value is invalid because of the write operand. Therefore, the value in the SA register 318 is only transferred to the AA register 319.

As described above, the step code (1-1) is processed in sequence on the pipeline.

(4.1.2) "Processing of the Second Step Code (1-2) of POP Instruction"

The A stage 203 inputs the A code 213 and the D code 212.

When the A code 213 is inputted to the A stage 203, in the A stage 203, address calculation is performed by control of a control signal in the A code 213. A value is outputted from the ASP register 311 which is a stack pointer of the A stage 203 to the A bus 322, and is stored in the BASE register 307. The INDEX register 308 and the DISP register 309 are cleared. The values of the BASE register 307, the INDEX register 308 and the DISP register 309 are added by the address adder 305, and the result thereof is stored in the AOUT register 306. By this operation, the content of the ASP register 311 is transferred to the AOUT register 306. Simultaneously, the ASP register 311 is incremented by +4. Furthermore, the value in the AOUT register 306 is transferred to the FA register 317 through the AO bus 323. The ASP value in the FA register 317 becomes the F code 215 along with part of the output of the second decoder 304.

When the result of intermediate decoding of the D code 212 is inputted, as shown in FIG. 34, the second decoder 304 generates entry addresses of microprograms and various control information.

Also, the right register number information and the left register number information in the D code 212 are inputted to the right register number generating unit 501 and the left register number generating unit 502 respectively, and the right register number $R_R$ and the left register number $R_L$ are generated. In the second step code (1-2) of the POP instruction, only the right register number $R_R$ is valid, and shows the SD register 514. The right register size $W_R$ shows a word.

This right register number information is not designated in the instruction format, but is generated in the D stage 202 when this step code (1-2) is generated.

The control information outputted by the second decoder 304 comprises the register number control information and the size control information. The register number control signal indicates that the right register number $R_R$ corresponds to the source register number $R_S$. The size control signal indicates that the right register size $W_R$ corresponds to the source register size $W_S$.

Among the register number control signals RC1, RC2, RC3 and RC4, only the signal RC1 is enabled, and only the N-channel TG 601 is turned on, and the right register number $R_R$ is held as the source register number $R_S$ in the first latch 5033. The destination register number $R_D$ is still the number held at processing by the step code (1-1) in the second latch 5034. Also, among the size control signals SC1, SC2, SC3 and SC4, only the signal SC1 is enabled, and only the N-channel TG 701 is turned on, and the right register size $W_R$ is held as the source register size $W_S$ in the first latch 5043.

Thus, in the step code (1-2), the source register number $R_S$ shows the SD register 314 and the source register size $W_S$ shows a word.

The R code 214 is generated from these entry addresses of the microprograms, register numbers and the like.

The R code 214 and the F code 215 thus generated are simultaneously sent to the F stage 204.

When the R code/F code enable signal is enabled, the R stage 206 inputs the R code 214, and accesses to the micro ROM 105 by the entry address of the microprogram comprised in the R code 214. An output of the micro ROM 105 is decoded to become the E code 216 along with the register number and the like. The register shown by the source register number $R_S$ of this step code (1-2) is the SD register 314, and the source register size $W_S$ is a word.

When the R code/F code enable signal is enabled, the OF stage 207 inputs the F code 215. The value of the FA register 317 which is part of the F code 215 is the SP value of this instruction. Then, pre-fetching of the operand is performed for the stack top through the external bus interface unit 107 with the value of the FA register 317 taken as an address value. In the access to this stack top, the prefetched value is read into the data processor of the present invention through the external bus interface unit 107, being held in the SD register 314 from the DD bus 320.

The value in the SD register 314 is sent to the E stage 205 as part of the S code 217.

When the E code 216 and the S code 217 are inputted, the E stage 205 performs processing of "transfer the value in the register shown by the source register number $R_S$ with the value of the AA register 319 taken as the destination address". In this case, the register shown by the source register number $R_S$ is the SD register 314. Accordingly, the value in the SD register 314 prefetched from the stack top by the initial two clocks (one step) is sent from the S1 bus 325 to the ALU 313, and is transferred from the DO bus 327 to the DD register 315 without being operated.

Data sent to the DD register 315 by the next two clocks (one step) is stored through the external bus interface unit 107 with the value in the AA register 319 held in the processing of the step code (1-1) taken as the destination address.

In the E stage 205, basically the second step code (1-2) of the ASP instruction necessitates four clocks (two steps) for processing. However, since operation and store of data are performed in a pipelined manner, there is the case where processing of the next instruction is sometimes started during storing processing of data, and in this case, only two clocks (one step) are required for processing.

As described above, the step code (1-2) is processed in sequence in the pipeline processing mechanism.

In the data processor of the present invention, as shown in FIG. 36(a), the step code (1-1) and the step code (1-2) of the POP instruction are processed in sequence in each stage of the pipeline. Accordingly, it is understood that dispersion of load to each stage is satisfactorily performed in processing the POP instruction.

(4.2) "Where Destination Is Designated as Register"

In the case where the addressing mode is the register direct mode, the processing relating to the destination operand can be simplified because the destination has become the general-purpose register.

Hereinafter, detailed description is made on how to simplify the processing relating to the destination operand in the case where the addressing mode of the POP instruction is the register direct mode.

In addition, the register number of the general-purpose register to become the destination here is assumed to be $R_I$. Accordingly, the general-purpose register number Rn in FIG. 37(b) is $R_I$.

Firsts the IF stage 201 fetches the POP instruction from the memory and inputs it to the instruction queue 301, and outputs the instruction code 211 of the POP instruction to the D stage 202.

The D stage 202 decodes the POP instruction fetched by the IF stage 201 by the first decoder 303.

The instruction code 211 of the POP instruction is inputted to the first decoder 303 to be decoded, and the first step code (2-1) of the POP instruction is generated. Part of the result of decoding is held in the inner state holding latch 401 as an inner state signal.

In the next decoding cycle, in response to the inner state signal from the inner state holding latch 401, the first decoder 303 does not take-in the instruction code 211 from the IF stage 201, and generates a second step code (2-2) of the POP instruction. Thus, as shown in FIG. 35(b), two step codes are generated.

No source operand designating part is comprised in the instruction, but it is implied that as a function of the instruction, the source operand is the stack top. In the data processor of the present invention, in the stage of decoding the POP instruction, the step code (2-2) for preliminarily performing the processing relating to the source operand is generated.

Each step code outputted from the D stage 202 is configured with the A code 213 and the D code 212. The A code 213 and the D code 212 comprised in the same step code are simultaneously sent to the A stage 203. The step codes generated from the POP instruction are sent to the A stage 203 in the sequence of the step code (2-1) and the step code (2-2).

For processings in the following stages, description is made on each step code.

(4.2.1) "Processing of the First Step Code (2-1) of POP Instruction"

The A stage 203 inputs the A code 213 and the D code 212. However, even if the A code 213 is inputted to the A stage 203, processing of address calculation is not performed because of the register direct mode.

As shown in FIG. 34, when the result of intermediate decoding of the D code 212 is inputted, the second decoder 304 generates the entry address of the microprogram and various control information.

The right register number information and the left register number information in the D code 212 are inputted to the right register number generating unit 501 and the left register number generating unit 502 respectively, and the right register number $R_R$ and the left register number $R_L$ are generated. In the step code (2-1) of the POP instruction, only the right register number $R_R$ is valid, and indicates the general-purpose register RI comprised in the general-purpose register file, and the right register size $W_R$ indicates a word.

The control information outputted from the second decoder 304 comprises the register number control information and the size control information. The register number control signal indicates that the right register number $R_R$ corresponds to the destination register number $R_D$. The size control signal indicates that the right register size $W_R$ corresponds to the destination register size $W_D$.

Among the register number control signals RC1, RC2, RC3 and RC4, only the signal RC3 is enabled, and only the N-channel TG 603 is turned on, and the right register number $R_R$ is held as the destination register number $R_D$ in the second latch 5034. Among the size control signals SC1, SC2, SC3 and SC4, only the signal SC3 is enabled, and only the N-channel TG 703 is turned on, and the right register size $W_R$ is held as the destination register size $W_D$ in the second latch 5044.

As described above, in the step code (2-1), the destination register number $R_D$ shows the general-purpose register RI, and the destination register size $W_D$ shows a word.

Since the addressing mode is of register direct addressing, the second decoder 304 does not enable the R code/F code enable signal. Accordingly, the F stage 204 does not input the step code (2-1). This means that the step code (2-1) disappears in the A stage 203.

The destination register number $R_D$ and the destination register size $W_D$ continue to be held in order to be delivered to the step code (2-2).

In the case of an addressing mode other than the register direct mode, the step code (2-1) for performing the processing relating to the destination operand performs processing of retreating the destination address value into the AA register 219 in the E stage 205. However, that processing is unnecessary to be performed because of the register direct mode. Accordingly, in the data processor of the present invention, in the case of processing the POP instruction wherein the addressing mode is the register direct mode, the step code (2-1) is extinguished.

(4.2.2) "Processing of the Second Step Code (2-2) of POP Instruction"

The A stage 203 inputs the A code 213 and the D code 212. When the A code 213 is inputted to the A stage 203, in the A stage 203, address calculation is performed by control of a control signal in the A code 213. That value is outputted to the A bus 322 from the ASP register 311 which is the stack pointer of the A stage 203, being stored in the BASE register 307. The INDEX register 308 and the DISP register 309 are cleared. The values of the BASE register 307, the INDEX register 308 and the DISP register 309 are added with the address adder 305, and the result thereof is stored in the AOUT register 306. By this operation, the content of the ASP register 311 is transferred to the AOUT register 306. At the same time, the ASP register 311 is incremented by +4. Furthermore, the value in the AOUT register 306 is sent to the FA register 317 through the AO bus 323. The ASP value in the FA register 317 becomes the F code 215 along with part of the output of the second decoder 304.

As shown in FIG. 34, when the result of intermediate decoding of the D code 212 is inputted, the second decoder 304 generates the entry address of the microprogram and various control information.

The right register number information and the left register number information in the D code 212 are inputted to the right register number generating unit 501 and the left register number generating unit 502 respectively, and the right register number $R_R$ and the left register number $R_L$ are generated. In the step code (2-2) of the POP instruction, only the right register number $R_R$ is valid and shows the SD register 314. The register size $W_R$ shows a word. The right register number information of this step code (2-2) is not designated in the instruction format, but is generated in the D stage 202 in generating this step code (2-2).

The control information outputted from the second decoder 304 comprises the register number control information and the size control information. The register number control signal indicates that the right register number $R_R$ corresponds to the source register number $R_S$, and the size control signal indicates that the right register size $W_R$ corresponds to the source register size $W_S$.

Among the register number control signals RC1, RC2, RC3 and RC4, only the signal RC1 is enabled, and only the N-channel TG 601 is turned on, and the right register number $R_R$ is held as the source register number $R_S$ in the first latch 5033. The destination register number $R_D$ is still the number held at the processing by the step code (2-1) in the second latch 5034. Among the size control signals SC1, SC2, SC3 and SC4, only the signal SC1 is enabled, and only the N-channel TG 701 is turned on, and the right register size $W_R$ is held as the source register size $W_S$ in the first latch 5043. The destination register size $W_D$ is still the size held at the processing by the step code (2-1) in the second latch 5044.

Thus, in the step code (2-2), the destination register number $R_D$ shows the general-purpose register RI, the source register number $R_S$ shows the SD register 314, the destination register size $W_D$ shows a word, and the source register size $W_S$ shows a word. Accordingly, part of the information of the step code (2-1) is merged into the step code (2-2).

At the register direct mode, in the second decoder 304, one bit of low order of the entry address of the microprogram is outputted in an inverted fashion. Accordingly, the processing by the microinstruction differs in the case where the destination address is the register and in the other cases.

The R code 214 is generated from these entry address of microprogram, register number and the like.

The R code 214 and the F code 215 thus generated are simultaneously sent to the F stage 204.

When the R code/F code enable signal is enabled, the R stage 206 inputs the R code 214, and accesses to the micro ROM 105 with the entry address of the microprogram comprised therein. The output of the micro ROM 105 is decoded, becoming the E code 216 along with the register number and the like. The register shown by the source register number $R_S$ of this step code (2-2) is the SD register 314, and the register shown by the destination register number $R_D$ is the general-purpose register RI. The source register size $W_S$ and the destination register size $W_D$ are words, respectively.

When the R code/F code enable signal is enabled, the OF stage 207 inputs the F code 215. The value in the FA register 317 which is part of the F code 215 is the SP value of this instruction. Prefetching of the operand is performed from the stack top through the external bus interface unit 107 with the value in the FA register 317 taken as the address. By this access to this stack top, the prefetched value is read into the data processor of the present invention through the external bus interface unit 107, and is held in the SD register 314 from the DD bus 320. The value in the SD register 314 is sent to the E stage 205 as part of the S code 217.

When the E stage 205 inputs the E code 218 and the S code 217, processing of "transfer the value in the register shown by the source register number $R_S$ to the register shown by the destination register number $R_D$" is performed.

In this case, the register shown by the destination register number $R_D$ is the general-purpose register RI, and the register shown by the source register number $R_S$ is the SD register 314. Accordingly, the value in the SD register 314 prefetched from the stack top is sent from the S1 bus 325 to the ALU 313, and is transferred from the DO bus 327 to the general-purpose register RI without being operated.

As described above, the step code (2-2) is processed in sequence in the pipeline processing mechanism.

In the data processor of the present invention, in the case where no waiting state is present in the pipeline processing mechanism, as shown in FIG. 36(b), the step code (2-1) and the step code (2-2) of the POP instruction are processed in sequence in each stage of the pipeline. During this time, the step code (2-1) disappears in the A stage 203, and only the required information is merged into the step code (2-2).

As shown in FIGS. 36(a) and (b), except for data storing operation in the E stage 205, the number of steps required for processing is the same both for the case where one of the step codes of the POP instruction is absorption-processed in the state that no waiting state is present in the pipeline processing mechanism and for the case where the step code is not merged.

Here, consideration is made on the case where since a step code (4-1) of the instruction one-preceding the POP instruction requires three steps for processing in the E stage 205, the step code of the POP instruction is put in the two-step waiting state in the F stage 204.

Figure 36D:
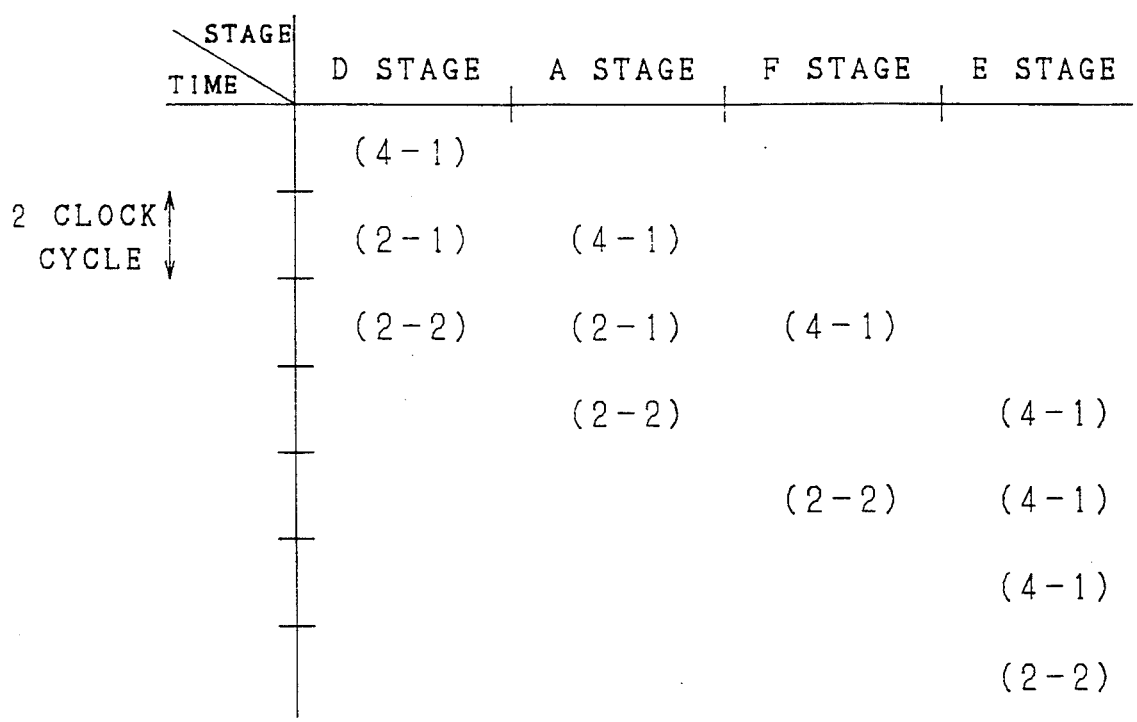

FIG. 36(c) shows the case where the step codes of the POP instruction are not merged, and FIG. 36(d) shows the case where one of the step codes of the POP instruction is merged.

As is clarified in FIG. 36(d), by the absorption of the step code (2-1), the number of step codes to be processed in the E stage 205 is decreased, and resultingly the number of steps required for the whole processing is decreased.

As described above, absorption of the unnecessary step code (2-1) into the pipeline processing mechanism has a great possibility of reducing the number of steps required for processing in the case where the waiting state has occurred in the pipeline processing mechanism, and thereby the processing speed of the data processor is improved.

(5) "Processing Sequence of I-format Instruction"

In the data processor of the present invention, absorption of a step code is executed also relating to the I-format instruction of register direct addressing. The processing method of the I-format instruction of register direct addressing is similar to the processing method of the POP instruction where the addressing mode is the register direct mode.

Detailed description is made hereinafter on how the I-format instruction wherein the addressing mode is the register direct mode is processed on the pipeline mechanism.

As an example of the I-format instruction, the ADD instruction (ADD:I instruction) of I-format which is an instruction of addition is described.

Figure 38:
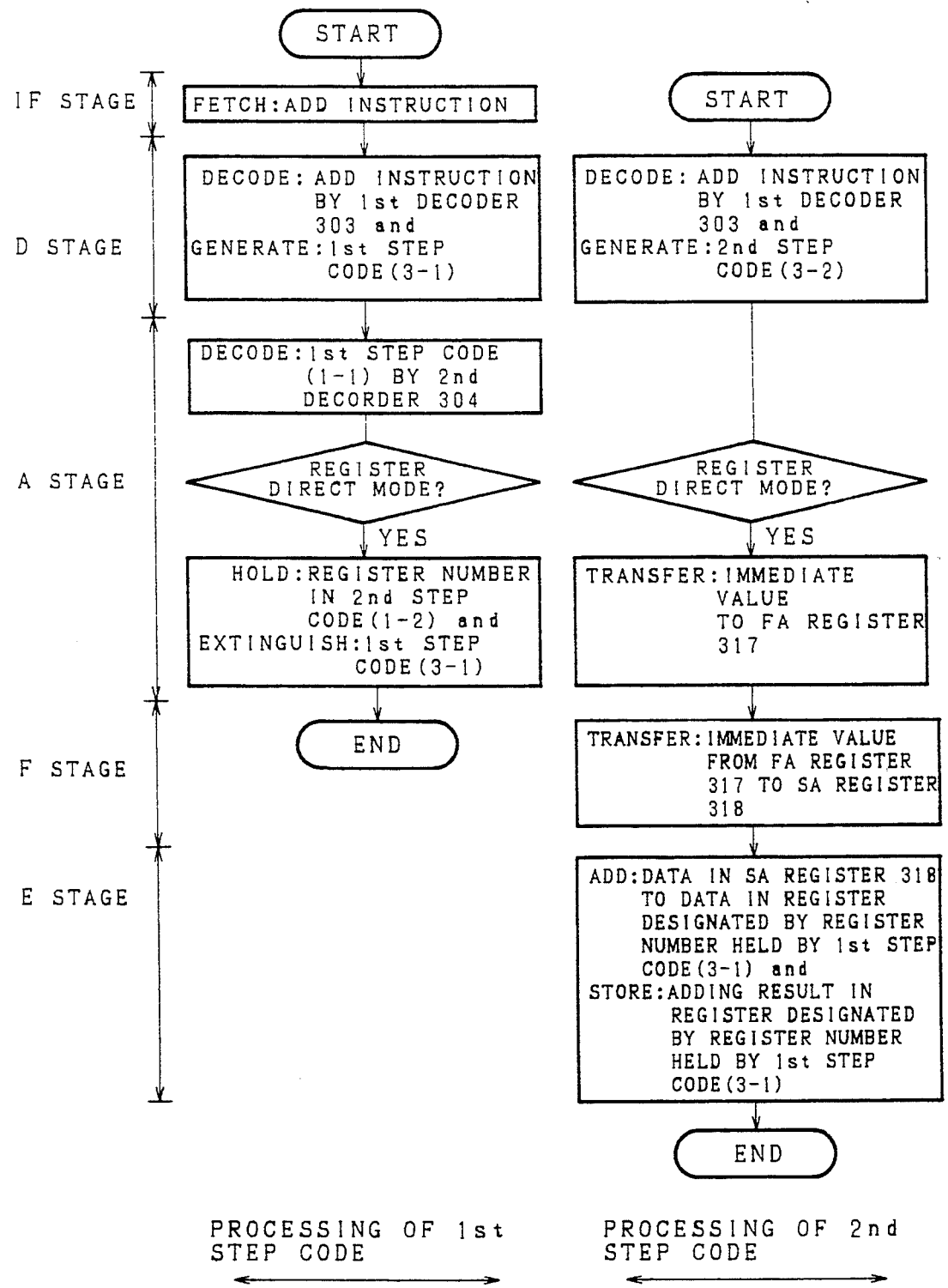
FIG. 38 is a flowchart showing a processing sequence of an I-format instruction as a register direct addressing mode on a pipeline processing mechanism.
Figure 39:
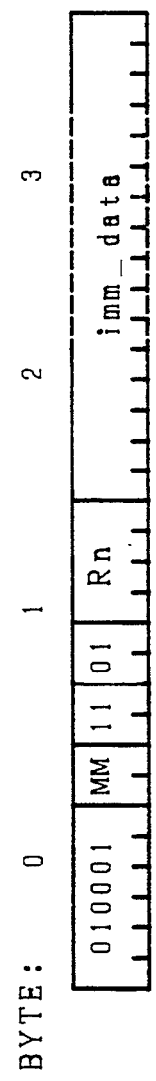
FIG. 39 is a schematic diagram showing an instruction format of an ADD instruction of an I-format of a register direct addressing mode.

FIG. 38 is a flow chart showing a processing sequence of the ADD instruction on the pipeline mechanism. Also, FIG. 39 is a schematic diagram of an instruction format of the ADD:I instruction.

(5.1) "Processing of ADD Instruction of Register Direct Addressing"

Here, the register number of a general-purpose register to become destination is assumed to be RI. Also, the size of the immediate value is assumed to be a word.

First, the IF stage 219 fetches the ADD:I instruction from the memory, inputs it to the instruction queue 301, and outputs the instruction code 211 of the ADD:I instruction to the D stage 202.

The D stage 202 decodes the ADD:I instruction, which is fetched by the IF stage 201, using the first decoder 303. Since the ADD instruction is a two-operand instruction, two step codes are produced to process each operand of destination and source. The step codes relating to processing of destination and source are a step code (3-1) and a step code (3-2), respectively.

The step codes produced by decoding the ADD:I instruction are sent to an A stage 203 in a sequence of the step code (3-1) and the step code (3-2).

Processings in the subsequent stages are described on each step code.

(5.1.1) "Processing of the First Step Code (3-1) of ADD:I Instruction"

The A stage 203 inputs the A code 213 and the D code 212. However, when if the A code 213 is inputted to the A stage 203, operation of address calculation is not executed because the addressing mode is the register direct mode.

As shown in FIG. 34, when the intermediate result of decoding of the D code 212 is inputted, the second decoder 304 produces an entry address of a micro-program and various control information.

Also, the right register number information and left register number information in the D code 212 are inputted to the right register number generation unit 501 and a left register number generation unit 502 respectively, and the right register number $R_R$ and a left register number $R_L$ are generated. In the step code (3-1) of the ADD:I instruction, only the right register number $R_R$ is significant, and indicates the general-purpose register RI located in the general-purpose register file 312, and a right register size $W_R$ indicated one word.

Control information outputted from the second decoder 304 comprises register number control information and size control information. A register number control signal indicates that the right register number $R_R$ corresponds to a destination register number $R_D$. A size control signal indicates that the right register size $W_R$ corresponds to a destination register size $W_D$.

Among register number control signals RC1, RC2, RC3 and RC4, only the signal RC3 is enabled, only the N channel TG603 is turned on, so that the right register number $R_R$ is held as the destination register number $R_D$ in the second latch 5034. Also, among size control signals SC1, SC2, SC3 and SC4, only the signal SC3 is enabled, only the N channel TG703 is turned on, so that the right register size $W_R$ is held as the destination register size $W_D$ in the second latch 5044.

Thus, in the step code (3-1), the destination register number $R_D$ indicates the general-purpose register RI, and the destination register size $W_D$ indicates a word.

The second decoder 304 does not enable the R code/F code enable signal because the addressing mode is of register direct addressing. Accordingly, the F stage 204 does not input the step code (3-1). This means that the step code (3-1) disappears in the A stage 203.

The destination register number $R_D$ and the destination register size $W_D$ are kept held held to be delivered to the step code (3-2).

In the case of an addressing mode other than the register direct mode, the step code (3-1) which processes relating to the destination operand executes address calculation, pre-fetch of the operand for the address thereof, save of operand data and save of that address. However, because of the register direct mode, those processings are not required to be executed. Accordingly, in the data processor in accordance with the present invention, when the ADD:I instruction wherein the addressing mode is the register direct mode is processed, the step code (3-1) is disappeared.

(5.1.2.) "Processing of the Second Step Code (3-2) of ADD:I Instruction"

The A stage 203 inputs the A code 213 and the D code 212. When the A code 213 is inputted to the A stage 203, in the A stage 203, address calculation is executed under control of a control signal of the A code 213. The immediate value is stored into the BASE register 307 from a DISP bus 321. The INDEX register 308 and the DISP register 309 are cleared. The values of the BASE register 307, the INDEX register 308 and the DISP register 309 are added by an address adder 305, and the result of the addition is stored in the AOUT register 306. Furthermore, the value in the AOUT register 306 is sent to the FA register 317 through the AO bus 323. The immediate value stored in this FA register 317 becomes the F code 215 together with part of the output of the second decoder 304.

As shown in FIG. 34, when the intermediate result of decoding of the D code 212 is inputted, the second decoder 304 generates the entry address of the microprogram and various control information.

Also, the right register number information and the left register number information in the D code 212 of the step code (3-2) are inputted to the right register number generation unit 501 and the left register number generation unit 502 respectively, and the right register number $R_R$ and the left register number $R_L$ are generated. In the step code (3-2) of the ADD:I instruction, only the right register number $R_R$ is significant and indicates an SA register 318, and the right register size $W_R$ indicates a word.

Control information outputted from the second decoder 304 comprises register number control information and size control information. The register number control signal indicates that the right register number $R_R$ corresponds to the source register number $R_S$. The size control signal shows that the right register size $W_R$ corresponds to the source register size.

Among the register number control signals RC1, RC2, RC3 and RC4, only the signal RC1 is enabled, only an N channel TG601 is turned on, so that the right register number $R_R$ is held as a source register number $R_S$ in the first latch 5033, and a source register number $R_S$ is outputted. The destination register number $R_D$ is still the number held at the processing of the step code (3-1) in the second latch 5034. Also, among the size control signals SC1, SC2, SC3 and SC4, only the signal SC1 is enabled, only the N channel TG701 is turned on, so that the right register size $W_R$ is held as a source register size $W_S$ in the first latch 5043, and a source register size $W_S$ is outputted. The destination register size $W_D$ is still the size held at the processing of the step code (3-1) in the second latch 5044.

Thus, in the step code (3-2), the destination register number $R_D$ indicates the general-purpose register RI, the source register number $R_S$ indicates the SA register 318, the destination register size $W_D$ indicates a word, and the source register size $W_S$ indicates a word. Accordingly, part of the information in a step code (3-1) is absorbed into the step code (3-2).

Also, in the case of the register direct mode, in the second decoder 304, one low-order bit of the entry address of a micro-program is inverted and outputted. Accordingly, processing by a micro-program in the case where the destination address is a register differs from those in the other cases.

The R code 214 is generated from the entry address of the micro-program and the register number.

The R code 214 thus generated and the F code 215 are sent simultaneously to the F stage 204.

When the R code/F code enable signal is enabled, the R stage 206 inputs the R code 214, and accesses to a micro ROM 105 by the entry address of the micro-program comprised in this code. Output of the micro ROM 105 is decoded, becoming the E code 216 together with the register number and the like. tIn the step code (3-2), he register indicated by the source register number $R_S$ is the SA register 318, and the register indicated by the destination register number $R_D$ is the general-purpose register RI. Also, the source register size $W_S$ and the destination register size $W_D$ are one word respectively.

When the R code/F code enable signal is enabled, the 0F stage 207 inputs the F code 215. The value of the FA register 317 which is part of the F code 215 is an immediate value. The value of the FA register 317 is transferred to the SA register 318. The value of the SA register 318 is sent to an E stage 205 as part of an S code 217.

When the E stage 205 inputs the E code 216 and the S code 217, the value in the register indicated by the source register number $R_S$ and the value in the register indicated by the destination register number $R_D$ are inputted to the an ALU 313 respectively from an S1 bus 325 and an S2 bus 326 to be added, and the result of the addition is transferred from a DO bus 327 to the register indicated by the destination register number $R_D$. In this case, the register indicated by the source register number $R_S$ is the SA register 318, and the register indicated by the destination register number $R_D$ is the general-purpose register RI. Accordingly, the immediate value and the value in the general-purpose register RI are inputted to the ALU 313 through the S1 bus 325 and the S2 bus 326 robe added respectively. The result of the addition is transferred to the general-purpose register RI through a DO bus 108.

As described above, the step code (3-2) is processed sequentially on the pipeline mechanism.

The ADD:I instruction whose addressing mode is the register direct mode is processed like the processing on the pipeline of the POP instruction of the register direct mode as shown in FIG. 36(b). Accordingly, as is the case with the POP instruction of the register direct mode as described in paragraph (4.2.2), when a waiting state has taken place on the pipeline mechanism, the number of steps required for the whole processing of the I-format instruction is reduced by absorbing the step code.

Also, in the above-mentioned embodiment, the case is shown where absorption of the step code is executed in the A stage 203, but it is also possible to adopt a configuration of executing absorption of the step code in the D stage 202.

In addition, where the chained addressing mode is specified as an addressing mode, step codes are generated in the number of stages. The step code for the chained addressing mode is absorbed in the A stage 203, and processings in the subsequent stages are the same as the processing in the above-described case.

As detailed above, in accordance with the present invention, the data processor is configured in a manner that processing units of the processings not required to be executed in the instruction execution stage in processing the immediate value operand instruction of the register direct addressing mode are extinguished, and therefore where a waiting state has taken place on the pipeline mechanism, the number of processing steps required in executing the immediate value operand instruction of the register direct mode is reduced, and the time occupied by the instruction execution stage for the processing of these instructions is reduced, and thereby the processing speed of the data processor can be improved.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A data processor that includes internal registers and executes an instruction having a format which includes an operation code field specifying a first operand and the operation to be performed on the first operand, and an operand address field specifying a location of a second operand, said data processor comprising:

a pipeline for executing the instruction in a plurality of stages which comprises:

a first stage for decomposing the instruction, including decode means for decoding the instruction to generate a first unit decoding processing code during a first given time period and to generate a second unit decoding processing code during a second given time following said first given time period, with said first unit decoding processing code relating to the second operand, and said second unit processing code relating to the first operand;

a second stage, coupled to said first stage, said second stage including means for terminating processing said first unit decoding processing code at said second stage by merging said first unit decoding processing code into said second unit decoding processing code when the specified location of the second operand is in one of said internal registers so that only said second unit processing code is output, and for concurrently processing said first and second unit decoding processing codes when the specified location of the second operand is not in one of said internal registers; and a third stage, coupled to an output of said second stage, for completing the execution of the instruction and storing a result, wherein said internal registers are general purpose registers.

2. The data processor of claim 1 wherein said second stage further comprises:

means for determining whether the specified location of the second operand is in one of the internal registers.

3. The processor of claim 2 wherein said second stage further comprises:

means, responsive to said determining means and addressable by said second unit processing code, for holding the identity of a specified internal register which stores the second operand.

4. A data processor that includes internal registers and executes an instruction which includes an operation code field specifying an immediate value as a first operand and the the operation to be preformed on the first operand, and an operand address field specifying a location of a second operand, said data processor comprising:

a pipeline for executing the instruction in a plurality of stages which comprises:

a first stage for decomposing the instruction including decode means for decoding the instruction during a first given time period to generate a first unit decoding processing code relating to said second operant, and to generate a second unit decoding processing code relating to the immediate value during a second given time period following said first given time period, with said first unit decoding processing code indicating whether the location of the second operand specified by the instruction is in one of the internal registers a second stage, coupled to said first stage, said second stage including means for terminating processing said first unit decoding processing code at said second stage by merging said first unit processing code into said second unit decoding processing code when the specified location of the second operand is in one of the internal registers so that only said second unit processing code is output, and for concurrently processing said first and second unit decoding processing codes when the specified location of the second operand in not in one of the internal registers; and a third stage, coupled to said second stage, for completing the execution of the instruction and storing a result, wherein said internal registers are general purpose registers.

5. The data processor of claim 4 wherein said second stage further comprises:

means, responsive to said first unit processing code and addressable by said second unit processing code, for holding the identity of a specified internal register which stores the second operand.

6. In a data processor including internal registers and a pipeline for executing an instruction in a plurality of stages including a first stage for decomposing the instruction, a second stage coupled to the first stage for processing the output of the first stage, and a third stage coupled to the second stage for processing the output of the second stage, a method for executing the instruction which includes an operation code field specifying an immediate value as a first operand and the operation to be performed on the first operand, and an operand address field specifying a location of a second operand, said method comprising the steps of:

decomposing at the first stage the instruction into first and second unit decoding processing codes relating to said second and first operands, respectively;

decoding said first unit decoding processing codes in the pipeline to determine whether the specified location of the second operand is in one of the internal registers;

subsequently decoding said second unit decoding processing code in the pipeline to operate on the immediate value;

terminating processing said first unit decoding processing code at the second stage by merging said first unit decoding processing code into said second unit decoding processing code if the specified location of the second operand is in one of the internal registers; and completing execution of the instruction in the third stage, wherein said internal registers are general purpose registers.

7. The method of claim 6 wherein said step of decoding said first unit decoding processing code further includes the step of:

holding the identity of a specified internal register in holding means, said specified internal register storing the second operand and said holding means being responsive to said first unit decoding processing code and addressable by said second unit decoding processing code.

* * * * *